US012726928B2

(12) United States Patent
Ren et al.

(10) Patent No.: US 12,726,928 B2
(45) Date of Patent: Sep. 1, 2026

(54) INFORMATION PROCESSING METHOD, DEVICE, TERMINAL AND NETWORK DEVICE

(71) Applicant: DATANG MOBILE COMMUNICATIONS EQUIPMENT CO., LTD., Beijing (CN)

(72) Inventors: Xiaotao Ren, Beijing (CN); Bin Ren, Beijing (CN); Ren Da, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 473 days.

(21) Appl. No.: 18/260,719

(22) PCT Filed: Dec. 2, 2021

(86) PCT No.: PCT/CN2021/135029
§ 371 (c)(1),
(2) Date: Jul. 7, 2023

(87) PCT Pub. No.: WO2022/151859
PCT Pub. Date: Jul. 21, 2022

(65) Prior Publication Data

US 2024/0057007 A1 Feb. 15, 2024

(30) Foreign Application Priority Data

Jan. 15, 2021 (CN) ......................... 202110055837.6

(51) Int. Cl.
*H04W 56/00* (2009.01)
*H04W 64/00* (2009.01)

(52) U.S. Cl.
CPC ..... *H04W 56/0055* (2013.01); *H04W 64/003* (2013.01)

(58) Field of Classification Search
CPC ........... H04W 56/0055; H04W 64/003; H04W 64/00; H04W 4/023; H04W 4/029;
(Continued)

(56) References Cited

U.S. PATENT DOCUMENTS 9,237,546 B1 1/2016 Zhang et al.
2002/0009974 A1 1/2002 Kuwahara et al.
(Continued)

FOREIGN PATENT DOCUMENTS

CN 1334688 A 2/2002
CN 1728600 A 2/2006
(Continued)

OTHER PUBLICATIONS

International Search Report and Written Opinion issued Feb. 23, 2022 in International Application No. PCT/CN2021/135029.
(Continued)

*Primary Examiner* — Nimesh Patel
(74) *Attorney, Agent, or Firm* — Harness, Dickey & Pierce, P.L.C.

(57) ABSTRACT

The present disclosure discloses an information processing method and device, a terminal and a network device. The information processing method includes: sending first information associated with sending and receiving timing delay or timing error to a terminal and/or a second network device; wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station; the first network device is the base station, the second network device is a positioning server; or, the first network device is the positioning server, and the second network device is the base station; the first informa-
(Continued)

tion is internal delay information or delay error information of the terminal or the base station.

19 Claims, 7 Drawing Sheets

(58) Field of Classification Search
CPC ....... H04W 4/02; H04W 4/021; H04W 12/63; H04W 76/15; H04W 4/38; H04W 48/18; H04W 24/02; H04W 4/025; H04W 56/0065; H04W 56/004; H04W 60/04; H04W 72/0453; H04W 12/104; H04W 16/18; H04W 84/042; H04W 84/00; H04W 8/245; H04W 72/563; H04W 74/0816; G01S 5/021; G01S 5/14; G01S 13/765; G01S 7/40; G01S 5/0018; G01S 5/0045; G01S 5/0236; G01S 5/0036; G01S 19/46; G01S 5/0226; G01S 5/0242; G01S 19/42; G01S 19/48; G01S 2013/466; G01S 19/40; G01S 2205/008; G01S 5/02521; H04B 7/0617; H04B 17/318; H04B 17/27; H04B 7/0626; H04B 7/088; H04B 7/0404; H04B 7/0413; H04B 17/252; H04B 17/254
See application file for complete search history.

(56) References Cited

U.S. PATENT DOCUMENTS

| | | | | |
|---|---|---|---|---|
| 2015/0257121 | A1* | 9/2015 | Siomina | G01S 5/0226 455/456.6 |
| 2016/0157053 | A1* | 6/2016 | Zhang | G01S 5/021 455/456.1 |
| 2018/0139747 | A1* | 5/2018 | Hosseini | H04W 72/21 |
| 2018/0343633 | A1* | 11/2018 | Uchino | H04L 5/0055 |
| 2020/0229124 | A1* | 7/2020 | Soriaga | H04W 4/023 |
| 2021/0219254 | A1 | 7/2021 | Wang et al. | |
| 2022/0015051 | A1* | 1/2022 | Duan | H04W 56/004 |
| 2022/0086822 | A1* | 3/2022 | Bao | G01S 7/40 |

FOREIGN PATENT DOCUMENTS

| | | | |
|---|---|---|---|
| CN | 1913703 | A | 2/2007 |
| CN | 101039154 | A | 9/2007 |
| CN | 101043254 | A | 9/2007 |
| CN | 101674589 | A | 3/2010 |
| CN | 110971326 | A | 4/2020 |
| CN | 111163028 | A | 5/2020 |
| CN | 111163513 | A | 5/2020 |

OTHER PUBLICATIONS

Moderator (CATT), "FL Summary for accuracy improvements by mitigating UE Rx/Tx and/or gNB Rx/Tx timing delays," 3GPP TSG RAN WG1 Meeting #105-e, R1-2105967, May 24, 2021.

Moderator (CATT), "FL Summary #3 for accuracy improvements by mitigating UE Rx/Tx and/or gNB Rx/Tx timing delays," 3GPP TSG RAN WG1 Meeting #104-e, R1-2102035, Feb. 5, 2021.

CATT, "Remaining issues on additional scenarios for evaluation of NR Positioning Enhancements," 3GPP TSG RAN WG1 Meeting #103-e, R1-2007858, Nov. 1, 2020.

Communication pursuant to Article 94(3) issued Jul. 25, 2025 in European Application No. 21 919 050.1.

Office Action issued May 21, 2024 in Chinese Application No. 2021100558376.

Moderator (Huawei), "Feature lead summary#1 on propagation delay compensation enhancements," 3GPP TSG RAN WG1 Meeting #102-e, R1-xxxxxx, Aug. 17, 2020.

Moderator (Huawei), "Feature lead summary on propagation delay compensation enhancements," 3GPP TSG RAN WG1 Meeting #103-e, R1-xxxxxx, Oct. 26, 2020.

Qualcomm Inc., "On UE Rx-Tx time difference measurements for NR positioning," 3GPP TSG-RAN WG4 Meeting #94-e, R4-2000733, Feb. 24, 2020.

Huawei, HiSilicon, "Discussion on accuracy requirements for UE Rx-Tx time difference measurement," 3GPP TSG-RAN WG4 Meeting #97-e, R4-2015763, Nov. 2, 2020.

* cited by examiner

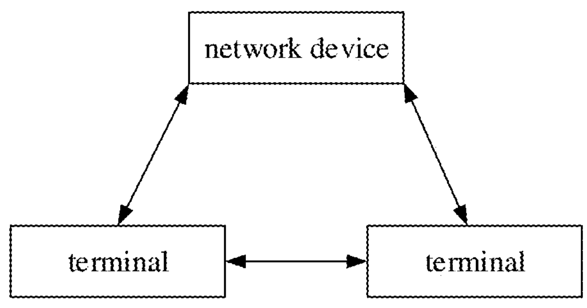

FIG. 1

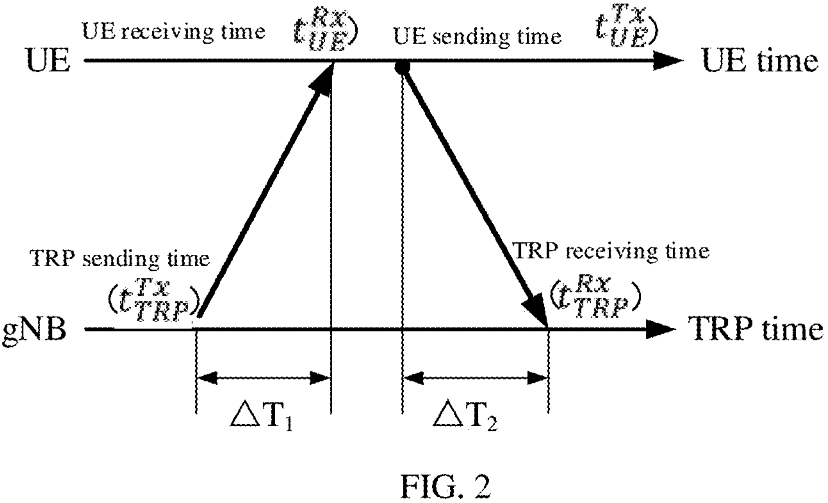

FIG. 2

Sending first information associated with sending and receiving timing delay or timing error to a terminal and/or a second network device; wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station; the first network device is the base station, the second network device is a positioning server; or, the first network device is the positioning server, and the second network device is the base station; the first information is internal delay information or delay error information of the terminal or the base station

INFORMATION PROCESSING METHOD, DEVICE, TERMINAL AND NETWORK DEVICE

CROSS-REFERENCE TO RELATED APPLICATION

This application is the U.S. national phase of PCT Application No. PCT/CN2021/135029 filed on Dec. 2, 2021, which claims priorities of the Chinese patent application No. 202110055837.6 filed on Jan. 15, 2021, the disclosures of each of which are incorporated herein by reference in their entireties.

TECHNICAL FIELD

The present disclosure relates to the field of communication technology, in particular to an information processing method and device, a terminal and a network device.

BACKGROUND

Among the positioning methods in the related art, the multiple round-trip time (Multi-RTT) positioning method is an important positioning method, and the working principle of the Multi-RTT positioning method is that, User Equipment (UE) reports the obtained UE sending and receiving time difference to Location Management Function (LMF), and each Transmit-Receive Point (TRP) also provides the obtain base station (gNodeB, gNB) sending and receiving time difference to the LMF, and the LMF obtains the distance between the UE and each TRP by using the UE sending and receiving time difference and the gNB sending and receiving time difference. Then other known information (such as the geographic coordinates of the TRP) are added to calculate the position of the UE.

That is, in the related art, for the Multi-RTT positioning method, in order to complete the measurement of the UE sending and receiving time difference or the gNB sending and receiving time difference, it is necessary for the TRP to send a Downlink Positioning Reference Signal (DL-PRS) and the UE sends a Sounding Reference Signal Position (SRS-Pos), the UE or gNB can complete the measurement of related measurement values based on the DL-PRS and SRS-Pos.

However, in related protocols, when calculating positioning time measurement values such as the UE sending and receiving time difference or the gNB sending and receiving time difference, it is assumed that time measurement is performed at the Antenna Connector position in the protocol; however, the actual time measurement position of the signal is at Baseband unit, so there will be time measurement error, which exists for both signal transmission and signal reception, which is called sending and receiving timing error. The existence of the sending and receiving timing error will lead to inaccurate measurement results of all time-based positioning measurement values including the UE sending and receiving time difference or the gNB sending and receiving time difference, thus affecting the final positioning accuracy.

It can be seen from the above that in the related art, the positioning accuracy of the positioning measurement method is reduced due to the existence of the sending and receiving timing error, and there is no indication scheme about the sending and receiving timing error in the related art, so the above problems cannot be avoided.

SUMMARY

The present disclosure aims to provide a signal processing method and device, a terminal and a network device, so as to solve the problem in the related art that the positioning accuracy is adversely affected because the sending and receiving timing error cannot be obtained.

An embodiment of the present disclosure provides an information processing method, applied to a first network device, including: sending first information associated with sending and receiving timing delay or timing error to a terminal and/or a second network device; wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station; the first network device is the base station, the second network device is a positioning server; or, the first network device is the positioning server, and the second network device is the base station; the first information is internal delay information or delay error information of the terminal or the base station.

Optionally, the first information includes at least one of the following information: a sending and receiving timing delay value of the terminal or the base station; sending and receiving timing uncertainty information of the terminal or the base station; a sending and receiving timing error value of the terminal or the base station value; a receiving timing delay value of the terminal or the base station; receiving timing uncertainty information of the terminal or the base station; a receiving timing error value of the terminal or the base station; a sending timing delay value of the terminal or the base station; sending timing uncertainty information of the terminal or the base station; a sending timing error value of the terminal or the base station; or synchronization error information between the base stations.

Optionally, the antenna unit comprises at least one of the following: an antenna, an antenna connector, an antenna port, or an antenna panel.

Optionally, the first information is product information or measurement information.

Optionally, in the case that the first information is measurement information, and the first network device is the base station, before the sending first information associated with sending and receiving timing delay or timing error to a terminal and/or a second network device, the method further includes: sending a calibration measurement signal using a sending antenna unit of the first network device; receiving the calibration measurement signal using a receiving antenna unit of the first network device; determining the first information according to a sending time and a receiving time of the calibration measurement signal.

Optionally, in the case that the first information is measurement information, and the first network device is the positioning server, before the sending first information associated with sending and receiving timing delay or timing error to a terminal and/or a second network device, the method further includes: receiving the first information sent by the terminal or the base station.

Optionally, the first information corresponds to a preset parameter, and different preset parameters correspond to different first information; the preset parameter includes at least one of the following: an antenna panel; an antenna; an antenna connector; an antenna port; a carrier; a frequency band; or an external environment parameter; wherein the external environment parameter includes a temperature, an air pressure and/or an altitude.

Optionally, information included in the first information is transmitted by means of independent transmission or combined transmission; the independent transmission refers to that the information included in the first information is transmitted separately; the combined transmission refers to at least two items of the information included in the first information are combined into one information for transmission.

Optionally, the sending and receiving timing error value, the receiving timing error value and the sending timing error value all refer to residual timing error values after pre-calibration by the terminal or the base station.

An embodiment of the present disclosure provides an information processing method, applied to a terminal, including: receiving first information associated with sending and receiving timing delay or timing error sent by a first network device; compensating for a time-based positioning measurement value according to the first information; wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station; the first network device is the base station, or, the first network device is the positioning server, the first information is internal delay information or delay error information of the terminal or the base station.

Optionally, the first information includes at least one of the following information: a sending and receiving timing delay value of the terminal or the base station; sending and receiving timing uncertainty information of the terminal or the base station; a sending and receiving timing error value of the terminal or the base station value; a receiving timing delay value of the terminal or the base station; receiving timing uncertainty information of the terminal or the base station; a receiving timing error value of the terminal or the base station; a sending timing delay value of the terminal or the base station; sending timing uncertainty information of the terminal or the base station; a sending timing error value of the terminal or the base station; or synchronization error information between the base stations.

Optionally, the antenna unit comprises at least one of the following: an antenna, an antenna connector, an antenna port, or an antenna panel.

Optionally, the first information is product information or measurement information.

Optionally, the first information corresponds to a preset parameter, and different preset parameters correspond to different first information; the preset parameter includes at least one of the following: an antenna panel; an antenna; an antenna connector; an antenna port; a carrier; a frequency band; or an external environment parameter; wherein the external environment parameter includes a temperature, an air pressure and/or an altitude.

the time-based positioning measurement value includes at least one of the following: downlink reference signal time difference; uplink relative arrival time; terminal sending and receiving time difference; or base station sending and receiving time difference.

Optionally, information included in the first information is transmitted by means of independent transmission or combined transmission; the independent transmission refers to that the information included in the first information is transmitted separately; the combined transmission refers to at least two items of the information included in the first information are combined into one information for transmission.

Optionally, the sending and receiving timing error value, the receiving timing error value and the sending timing error value all refer to residual timing error values after pre-calibration by the terminal or the base station.

Optionally, the compensating for the time-based positioning measurement value according to the first information includes: subtracting a value corresponding to the first information from an initial positioning measurement value to obtain a compensated positioning measurement value.

An embodiment of the present disclosure provides an information processing method, applied to a terminal, including: sending first information associated with sending and receiving timing delay or timing error to a second network device; wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station; the second network device is a positioning server; or, the second network device is the base station; the first information is internal delay information or delay error information of the terminal or the base station.

Optionally, the first information includes at least one of the following information: a sending and receiving timing delay value of the terminal or the base station; sending and receiving timing uncertainty information of the terminal or the base station; a sending and receiving timing error value of the terminal or the base station value; a receiving timing delay value of the terminal or the base station; receiving timing uncertainty information of the terminal or the base station; a receiving timing error value of the terminal or the base station; a sending timing delay value of the terminal or the base station; sending timing uncertainty information of the terminal or the base station; a sending timing error value of the terminal or the base station; or synchronization error information between the base stations.

Optionally, the antenna unit comprises at least one of the following: an antenna, an antenna connector, an antenna port, or an antenna panel.

Optionally, before the sending first information associated with sending and receiving timing delay or timing error to a second network device, the method further includes: determining whether the terminal measures or sends the first information according to a configuration parameter.

Optionally, the first information is product information or measurement information.

Optionally, in the case where the first information is measurement information, before the sending first information associated with sending and receiving timing delay or timing error to a second network device, the method further includes: sending a calibration measurement signal using a sending antenna unit of the terminal; receiving the calibration measurement signal using a receiving antenna unit of the terminal; determining the first information according to a sending time and a receiving time of the calibration measurement signal.

Optionally, the first information corresponds to a preset parameter, and different preset parameters correspond to different first information; the preset parameter includes at least one of the following: an antenna panel; an antenna; an antenna connector; an antenna port; a carrier; a frequency band; or an external environment parameter; wherein the external environment parameter includes a temperature, an air pressure and/or an altitude.

Optionally, information included in the first information is transmitted by means of independent transmission or combined transmission; the independent transmission refers to that the information included in the first information is transmitted separately; the combined transmission refers to at least two items of the information included in the first information are combined into one information for transmission.

Optionally, the sending and receiving timing error value, the receiving timing error value and the sending timing error value all refer to residual timing error values after pre-calibration by the terminal or the base station.

An embodiment of the present disclosure provides an information processing method, applied to a second network device, including: receiving first information associated with sending and receiving timing delay or timing error sent by a first network device or a terminal; compensating for a time-based positioning measurement value according to the first information; wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station; the first network device is the base station, the second network device is a positioning server; or, the first network device is the positioning server, and the second network device is the base station; the first information is internal delay information or delay error information of the terminal or the base station.

Optionally, the first information includes at least one of the following information: a sending and receiving timing delay value of the terminal or the base station; sending and receiving timing uncertainty information of the terminal or the base station; a sending and receiving timing error value of the terminal or the base station value; a receiving timing delay value of the terminal or the base station; receiving timing uncertainty information of the terminal or the base station; a receiving timing error value of the terminal or the base station; a sending timing delay value of the terminal or the base station; sending timing uncertainty information of the terminal or the base station; a sending timing error value of the terminal or the base station; or synchronization error information between the base stations.

Optionally, the antenna unit comprises at least one of the following: an antenna, an antenna connector, an antenna port, or an antenna panel.

Optionally, the first information corresponds to a preset parameter, and different preset parameters correspond to different first information; the preset parameter includes at least one of the following: an antenna panel; an antenna; an antenna connector; an antenna port; a carrier; a frequency band; or an external environment parameter; wherein the external environment parameter includes a temperature, an air pressure and/or an altitude.

Optionally, the time-based positioning measurement value includes at least one of the following: downlink reference signal time difference; uplink relative arrival time; terminal sending and receiving time difference; or base station sending and receiving time difference.

Optionally, information included in the first information is transmitted by means of independent transmission or combined transmission; the independent transmission refers to that the information included in the first information is transmitted separately; the combined transmission refers to at least two items of the information included in the first information are combined into one information for transmission.

Optionally, the sending and receiving timing error value, the receiving timing error value and the sending timing error value all refer to residual timing error values after pre-calibration by the terminal or the base station.

Optionally, the compensating for the time-based positioning measurement value according to the first information includes: subtracting a value corresponding to the first information from an initial positioning measurement value to obtain a compensated positioning measurement value.

An embodiment of the present disclosure provides a network device, being a first network device, including a memory, a transceiver, and a processor, wherein the memory is used to store computer programs; the transceiver is used to send and receive data under the control of the processor; the processor is used to read the computer programs in the memory and perform the following operations: sending first information associated with sending and receiving timing delay or timing error to a terminal and/or a second network device through the transceiver; wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station; the first network device is the base station, the second network device is a positioning server; or, the first network device is the positioning server, and the second network device is the base station; the first information is internal delay information or delay error information of the terminal or the base station.

Optionally, the first information includes at least one of the following information: a sending and receiving timing delay value of the terminal or the base station; sending and receiving timing uncertainty information of the terminal or the base station; a sending and receiving timing error value of the terminal or the base station value; a receiving timing delay value of the terminal or the base station; receiving timing uncertainty information of the terminal or the base station; a receiving timing error value of the terminal or the base station; a sending timing delay value of the terminal or the base station; sending timing uncertainty information of the terminal or the base station; a sending timing error value of the terminal or the base station; or synchronization error information between the base stations.

An embodiment of the present disclosure provides a terminal, including a memory, a transceiver, and a processor, wherein a memory is used to store computer programs; the transceiver is used to send and receive data under the control of the processor; the processor is used to read the computer programs in the memory and perform the following operations: receiving first information associated with sending and receiving timing delay or timing error sent by a first network device through the transceiver; compensating for a time-based positioning measurement value according to the first information; wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station; the first network device is the base station, or, the first network device is the positioning server, the first information is internal delay information or delay error information of the terminal or the base station.

Optionally, the first information includes at least one of the following information: a sending and receiving timing delay value of the terminal or the base station; sending and receiving timing uncertainty information of the terminal or the base station; a sending and receiving timing error value of the terminal or the base station value; a receiving timing delay value of the terminal or the base station; receiving timing uncertainty information of the terminal or the base station; a receiving timing error value of the terminal or the base station; a sending timing delay value of the terminal or the base station; sending timing uncertainty information of the terminal or the base station; a sending timing error value of the terminal or the base station; or synchronization error information between the base stations.

An embodiment of the present disclosure provides a terminal, including a memory, a transceiver, and a processor, wherein the memory is used to store computer programs; the transceiver is used to send and receive data under the control of the processor; the processor is used to read the computer programs in the memory and perform the following operations: sending first information associated with sending and receiving timing delay or timing error to a second network device through the transceiver; wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station; the second network device is a positioning server; or, the second network device is the base station; the first information is internal delay information or delay error information of the terminal or the base station.

Optionally, the first information includes at least one of the following information: a sending and receiving timing delay value of the terminal or the base station; sending and receiving timing uncertainty information of the terminal or the base station; a sending and receiving timing error value of the terminal or the base station value; a receiving timing delay value of the terminal or the base station; receiving timing uncertainty information of the terminal or the base station; a receiving timing error value of the terminal or the base station; a sending timing delay value of the terminal or the base station; sending timing uncertainty information of the terminal or the base station; a sending timing error value of the terminal or the base station; or synchronization error information between the base stations.

An embodiment of the present disclosure provides a network device, being a second network device, including a memory, a transceiver, and a processor, wherein the memory is used to store computer programs; the transceiver is used to send and receive data under the control of the processor; the processor is used to read the computer programs in the memory and perform the following operations: receiving first information associated with sending and receiving timing delay or timing error sent by a first network device or a terminal through the transceiver; compensating for a time-based positioning measurement value according to the first information; wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station; the first network device is the base station, the second network device is a positioning server; or, the first network device is the positioning server, and the second network device is the base station; the first information is internal delay information or delay error information of the terminal or the base station.

Optionally, the first information includes at least one of the following information: a sending and receiving timing delay value of the terminal or the base station; sending and receiving timing uncertainty information of the terminal or the base station; a sending and receiving timing error value of the terminal or the base station value; a receiving timing delay value of the terminal or the base station; receiving timing uncertainty information of the terminal or the base station; a receiving timing error value of the terminal or the base station; a sending timing delay value of the terminal or the base station; sending timing uncertainty information of the terminal or the base station; a sending timing error value of the terminal or the base station; or synchronization error information between the base stations.

An embodiment of the present disclosure provides an information processing device, applied to a first network device, including: a first sending unit, configured to send first information associated with sending and receiving timing delay or timing error to a terminal and/or a second network device; wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station; the first network device is the base station, the second network device is a positioning server; or, the first network device is the positioning server, and the second network device is the base station; the first information is internal delay information or delay error information of the terminal or the base station.

An embodiment of the present disclosure provides a terminal, including: a third receiving unit, configured to receive first information associated with sending and receiving timing delay or timing error sent by a first network device; a first processing unit, configured to compensate for a time-based positioning measurement value according to the first information; wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station; the first network device is the base station, or, the first network device is the positioning server, the first information is internal delay information or delay error information of the terminal or the base station.

An embodiment of the present disclosure provides an information processing device, applied to a terminal, including: a third sending unit, configured to send first information associated with sending and receiving timing delay or timing error to a second network device; wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station; the second network device is a positioning server; or, the second network device is the base station; the first information is internal delay information or delay error information of the terminal or the base station.

An embodiment of the present disclosure provides an information processing device, applied to a second network device, including: a fifth receiving unit, configured to receive first information associated with sending and receiving timing delay or timing error sent by a first network device or a terminal; a second processing unit, configured to compensate for a time-based positioning measurement value according to the first information; wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station; the first network device is the base station, the second network device is a positioning server; or, the first network device is the positioning server, and the second network device is the base station; the first information is internal delay information or delay error information of the terminal or the base station.

An embodiment of the present disclosure provides a processor-readable storage medium, storing a computer program, wherein the computer program is executed by a processor to implement the information processing method in the first network device side, or in the terminal side, or in the second network device side.

The above technical solutions has the following technical effect:

The information processing method provided by the embodiments of the present disclosure sends the first information associated with the sending and receiving timing delay or timing error to the terminal and/or the second network device; wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station; the first network device is the base station, the second network device is a positioning server; or, the first network device is the positioning server, and the second network device is the base station; the first information is internal delay information or delay error information of the terminal or the base station, it can realize that the information related to the UE or gNB sending and receiving timing error (or sending and receiving timing delay) is indicated, so as to assist the network device or UE to determine whether time-based positioning measurement value has a time measurement error (or time delay) and the specific value of the time measurement error (or time delay), so that the network device or UE can use the information to compensate or adjust the time-based positioning measurement value when computing the terminal position, so as to avoid the impact of the sending and receiving timing error on the terminal position calculation accuracy, improve the positioning accuracy of the system, and solve the problem in the related art that the sending and receiving timing error cannot be known and affect the positioning accuracy.

BRIEF DESCRIPTION OF THE DRAWINGS

FIG. 1 is a schematic diagram of a wireless communication system architecture according to an embodiment of the present disclosure;

FIG. 2 is a schematic diagram of a Multi-RTT positioning scheme according to an embodiment of the present disclosure;

FIG. 3 is a first schematic flow diagram of an information processing method according to an embodiment of the present disclosure;

FIG. 4 is a second schematic flow diagram of an information processing method according to an embodiment of the present disclosure;

FIG. 5 is a third schematic flowchart of an information processing method according to an embodiment of the present disclosure;

DETAILED DESCRIPTION

Figure 6:
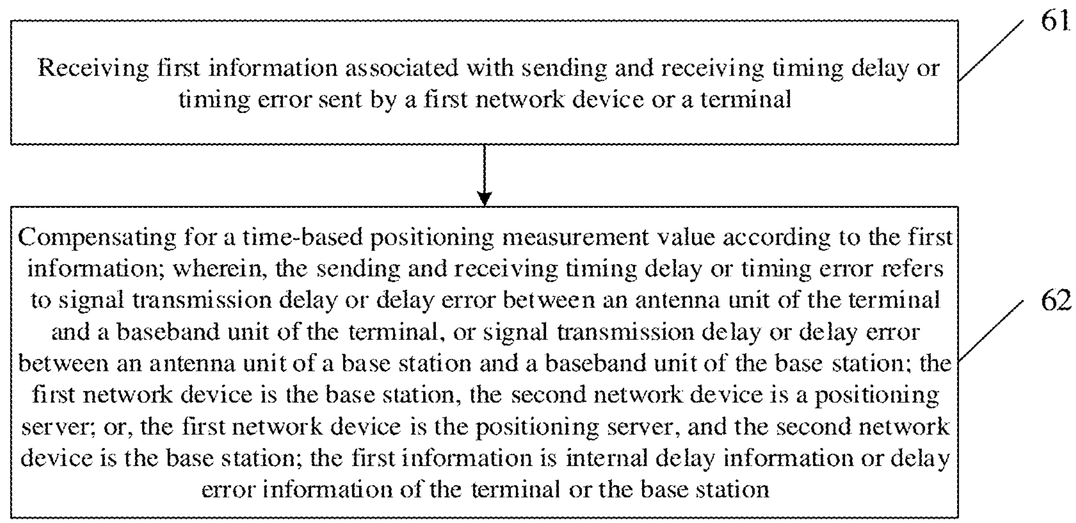
FIG. 6 is a fourth schematic flowchart of an information processing method according to an embodiment of the present disclosure.

The following will clearly and completely describe the technical solutions in the embodiments of the present disclosure with reference to the accompanying drawings. Obviously, the described embodiments are only some of the embodiments of the present application, not all of them. Based on the embodiments in the present disclosure, all other embodiments obtained by those ordinary skill in the art without making creative work belong to the scope of protection of the present disclosure.

The term "and/or" in the embodiments of the present disclosure describes the association relationship of associated objects, indicating that there may be three relationships, for example, A and/or B, which may mean: A exists alone, A and B exist simultaneously, and B exists alone. The character "/" generally indicates that the contextual objects are an "or" relationship.

The term "plurality" in the embodiments of the present disclosure refers to two or more, and other quantifiers are similar.

It should be noted that the technical solution provided by the embodiments of the present disclosure can be applied to various systems, especially a 5th Generation Mobile Communication Technology (5G) system. For example, the applicable system may be global system of mobile communication (GSM) system, code division multiple access (CDMA) system, wideband code division multiple access (WCDMA) general packet radio service (GPRS) system, long term evolution (LTE) system, LTE frequency division duplex (FDD) system, LTE time division duplex (TDD) system, Long term evolution advanced (LTE-A) system, universal mobile telecommunications system (UMTS), worldwide interoperability for microwave access (WiMAX) system, 5G New Radio (NR) system, etc. These various systems include terminals and network devices. The system may also include a core network part, such as an evolved packet system (EPS), a 5G system (5GS), and the like.

FIG. 1 shows a block diagram of a wireless communication system to which embodiments of the present disclosure are applicable. A wireless communication system includes a terminal and a network device.

The terminal involved in the embodiments of the present disclosure may be a device that provides voice and/or data connectivity to a user, a handheld device with a wireless connection function, or other processing devices connected to a wireless modem. In different systems, the name of the terminal may be different. For example, in a 5G system, the terminal may be called User Equipment (UE). The wireless terminal can communicate with one or more core networks (CN) via the radio access network (RAN), and the wireless terminal can be a mobile terminal device, such as a mobile phone (or called a "cellular" phone) and computers with mobile terminal, such as portable, pocket, hand-held, computer built-in or vehicle-mounted mobile devices, which exchange voice and/or data with the radio access network. For example, Personal Communication Service (PCS) phones, cordless phones, Session Initiated Protocol (SIP) phones, Wireless Local Loop (WLL) stations, Personal Digital Assistant (PDA) and other devices. Wireless terminal may also be called system, subscriber unit, subscriber station, mobile station, mobile station, remote station, access point, remote terminal, an access terminal, a user terminal device, a user agent, and a user device, which are not limited in the embodiments of the present disclosure.

The network device involved in the embodiments of the present disclosure may be a base station, and the base station may include multiple cells that provide services for terminals. Depending on the specific application, the base station can also be called an access point, or it can be a device in the access network that communicates with wireless terminals through one or more sectors on the air interface, or other names. The network device can be used to exchange received air frames with Internet Protocol (IP) packets, and act as a router between the wireless terminal and the rest of the access network, where the rest of the access network can include IP Communications network. The network device can also coordinate attribute management of the air interface. For example, the network device involved in this embodiment of the present disclosure may be a network device (Base Transceiver Station, BTS), or a network device (NodeB) in Wide-band Code Division Multiple Access (WCDMA), or an evolutional Node B (eNB or e-NodeB) in a long term evolution (LTE) system, 5G base station (gNB) in the 5G network architecture (next generation system), a home evolved base station (Home evolved Node B, HeNB), relay node, a home base station (femto), a pico base station (pico), etc., which are not limited in this embodiment of the present disclosure. In some network structures, the network device may include a centralized unit (CU) node and a distributed unit (DU) node, and the centralized unit and the distributed unit may also be arranged geographically separately.

One or more antennas can be used between the network device and the terminal for Multi Input Multi Output (MIMO) transmission, and MIMO transmission can be Single User MIMO (SU-MIMO) or Multi-User MIMO (MU-MIMO). According to the shape and quantity of root antenna combinations, MIMO transmission can be two-dimensional multiple-input multiple-output (2 Dimension MIMO, 2D-MIMO), three-dimensional multiple-input multiple-output (3 Dimension MIMO, 3D-MIMO), full-dimensional multiple-input multiple-output (Full Dimension MIMO, FD-MIMO) or massive multiple-input multiple-output (massive-MIMO), they can also be diversity transmission or precoding transmission or beamforming transmission, etc.

The content involved in the solutions provided by the embodiments of the present disclosure will be firstly introduced below.

The measurement value used by the Multi-RTT positioning method is the time difference between the arrival time of the DL-PRS from each TRP measured by the UE and UE sending the SRS-Pos (called UE sending and receiving time difference) and the time difference between the arrival time of SRS-Pos from UE measured by each TRP and TRP sending DL-PRS (called gNB sending and receiving time difference). As shown in FIG. 2, the signal round-trip time (Multi Round-Trip Time, RTT) between the UE and a TRP can be obtained by adding the UE sending and receiving time difference measured by the DL-PRS of the TRP (terminal receiving time $$(t_{UE}^{Rx})$$

—terminal sending time $$(t_{UE}^{Tx}))\ (t_{UE}^{Rx}-t_{UE}^{Tx})$$

and the gNB sending and receiving time difference of the TRP measured by the SRS-Pos of the UE (sending and receiving point receiving time $$(t_{TRP}^{Rx})$$

—the sending and receiving point sending time $$(t_{TRP}^{Tx}))\ t_{TRP}^{Rx}-t_{TRP}^{Tx})$$

(see formula 1 below), and the distance between the UE and the TRP can be obtained by multiplying ½RTT by the light speed. It is worth pointing out that when using this method to obtain the RTT, it does not require the UE to be precisely synchronized with the TRP time. Formula 1:

$$RTT=(\Delta T_1+\Delta T_2)=(t_{UE}^{Rx}-t_{TRP}^{Tx})+(t_{TRP}^{Rx}-t_{UE}^{Tx})=(t_{UE}^{Rx}-t_{UE}^{Tx})+(t_{TRP}^{Rx}-t_{TRP}^{Tx})$$

From the perspective of signal transmission and reception of the UE and each TRP, supporting the Multi-RTT positioning method is basically equivalent to simultaneously supporting the Downlink Time Difference of Arrival (DL- TDOA) positioning method and the Uplink Time Difference of Arrival (UL-TDOA) positioning method.

On the UE side, the UE sends SRS-Pos according to the SRS-Pos configuration provided by the served base station; and the UE learns the configuration information of the DL-PRS sent by the surrounding TRPs from the auxiliary data provided by the Location Management Function Unit (LMF). According to the DL-PRS configuration information of each TRP, the UE receives the DL-PRS sent by each TRP, and obtains the arrival time of the DL-PRS, and then the UE obtains the UE sending and receiving time difference according the time difference between the arrival time of the DL-PRS measured by the UE and the time when the UE sends the SRS-Pos.

At each TRP side, each TRP learns the configuration information of the SRS-Pos sent by the UE from the auxiliary data provided by the LMF, and receives the SRS-Pos sent by the UE according to the SRS-Pos configuration information, and obtains the arrival time of the SRS-Pos. Then each TRP obtains the gNB sending and receiving time difference according to the time difference between the arrival time of SRS-Pos measured by the TRP and the time when the TRP sends DL-PRS.

The Multi-RTT positioning method generally adopts a network-based positioning method. The UE reports the obtained UE sending and receiving time difference to the LMF, and each TRP also provides the obtained gNB sending and receiving time difference to the LMF, and the LMF uses the UE sending and receiving time difference and the gNB sending and receiving time difference to obtain the distance between the UE and each TRP. Then other known information (such as the geographic coordinates of the TRP) are added to calculate the position of the UE.

Based on the above, the embodiments of the present disclosure provide an information processing method, device, a terminal, and a network device to solve the problem in the related art that the timing error of sending and receiving cannot be obtain, which affects the positioning accuracy. Among them, the method, device, terminal, and network device are based on the same idea, and since the principles of solving problems of the method, device, terminal, and network device are similar, the implementation of the device, method, terminal, and network device can be referred to each other, which is not repeated herein.

Embodiment One

An embodiment of the present disclosure provides an information processing method, which is applied to a first network device, as shown in FIG. 3, including:

Step 31: Sending first information associated with sending and receiving timing delay or timing error to a terminal and/or a second network device; wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station; the first network device is the base station, the second network device is a positioning server; or, the first network device is the positioning server, and the second network device is the base station; the first information is internal delay information or delay error information of the terminal or the base station.

Wherein, when the first network device is the base station, the sending and receiving timing error may be measured by the base station (specifically, it may be measured by the first network device); when the first network device is a positioning server, the sending and receiving timing error may be measured by the terminal or the base station (forwarded by the first network device). The sending and receiving timing delay value may be an average value or a theoretical value of the sending and receiving timing delay, which is not limited here. The sending and receiving timing uncertainty information may be the degree information of the delay value (the sending and receiving timing) that deviates from the average delay value or the information about the standard deviation of the delay value (the sending and receiving timing), which is not limited here. The sending and receiving timing error may specifically refer to a signal transmission delay between the antenna unit of the base station from which the terminal can receive a positioning reference signal and the baseband unit of the base station. The first information may specifically correspond to at least two base stations. For example, three base stations send positioning reference signals to the UE. In this way, the first information may specifically include the sending and receiving timing delay value, receiving timing uncertainty information, receiving timing delay value, receiving timing uncertainty information, sending timing delay value, sending timing uncertainty information of each of the three base stations; and synchronization error information between two base stations of the three base stations, for example, the three base stations are A, B and C, then, the first information includes synchronization error information between base stations A and B, base stations A and C, and base stations B and C, synchronization error information of total three base stations. Specifically, the antenna unit may include at least one of a sending antenna unit and a receiving antenna unit.

The information processing method provided by the embodiments of the present disclosure sends the first information associated with the sending and receiving timing delay or timing error to the terminal and/or the second network device; wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station; the first network device is the base station, the second network device is a positioning server; or, the first network device is the positioning server, and the second network device is the base station; the first information is internal delay information or delay error information of the terminal or the base station, it can realize that the information related to the UE or gNB sending and receiving timing error (or sending and receiving timing delay) is indicated, so as to assist the network device or UE to determine whether time-based positioning measurement value has a time measurement error (or time delay) and the specific value of the time measurement error (or time delay), so that the network device or UE can use the information to compensate or adjust the time-based positioning measurement value when computing the terminal position, so as to avoid the impact of the sending and receiving timing error on the terminal position calculation accuracy, improve the positioning accuracy of the system, and solve the problem in the related art that the sending and receiving timing error cannot be known and affect the positioning accuracy.

Wherein, the first information includes at least one of the following information: the sending and receiving timing delay value of the terminal or the base station; the sending and receiving timing uncertainty information of the terminal or the base station; the sending and receiving timing error value of the terminal or the base station value; the receiving timing delay value of the terminal or the base station; the receiving timing uncertainty information of the terminal or the base station; the receiving timing error value of the terminal or the base station; the sending timing delay value of the terminal or the base station; the sending timing uncertainty information of the terminal or the base station; the sending timing error value of the terminal or the base station; the synchronization error information between the base stations.

In an embodiment of the present disclosure, the antenna unit includes at least one of the following: an antenna, an antenna connector, an antenna port, or an antenna panel.

Wherein, the first information is product information or measurement information.

In the embodiment of the present disclosure, the first information is the measurement information, and when the first network device is the base station, before the sending first information associated with sending and receiving timing delay or timing error to a terminal and/or a second network device, the method further includes: sending a calibration measurement signal using a sending antenna unit of the first network device; receiving the calibration measurement signal using a receiving antenna unit of the first network device; determining the first information according to a sending time and a receiving time of the calibration measurement signal.

Wherein, the first information is the measurement information, and when the first network device is a positioning server, before the sending first information associated with sending and receiving timing delay or timing error to a terminal and/or a second network device, the method further includes: receiving the first information sent by the terminal or the base station.

In the embodiment of the present disclosure, the first information corresponds to a preset parameter, and different preset parameters correspond to different first information; wherein, the preset parameters include at least one of the following: an antenna panel; an antenna; an antenna connector; an antenna port; a carrier; a frequency band; or an external environment parameter; the external environment parameter includes a temperature, an air pressure and/or an altitude.

Wherein, the information included in the first information is transmitted by means of independent transmission or combined transmission; wherein, the independent transmission refers to that the information included in the first information is transmitted separately; the combined transmission refers to at least two items of information included in the first information are combined into one information for transmission.

Specifically, it can be understood that the information included in the first information is transmitted in a manner of independent transmission or combined transmission. The independent transmission refers to that the information included in the first information are separated transmitted in the form of a plurality of information, and the combined transmission refers to that at least two of the information included in the first information are combined together to be transmitted in a form of singular information (transmission can be sending or receiving).

In the embodiments of the present disclosure, the sending and receiving timing error value, the receiving timing error value and the sending timing error value all refer to residual timing error values after pre-calibration by the terminal or the base station.

Embodiment Two

Figures 4, 5:
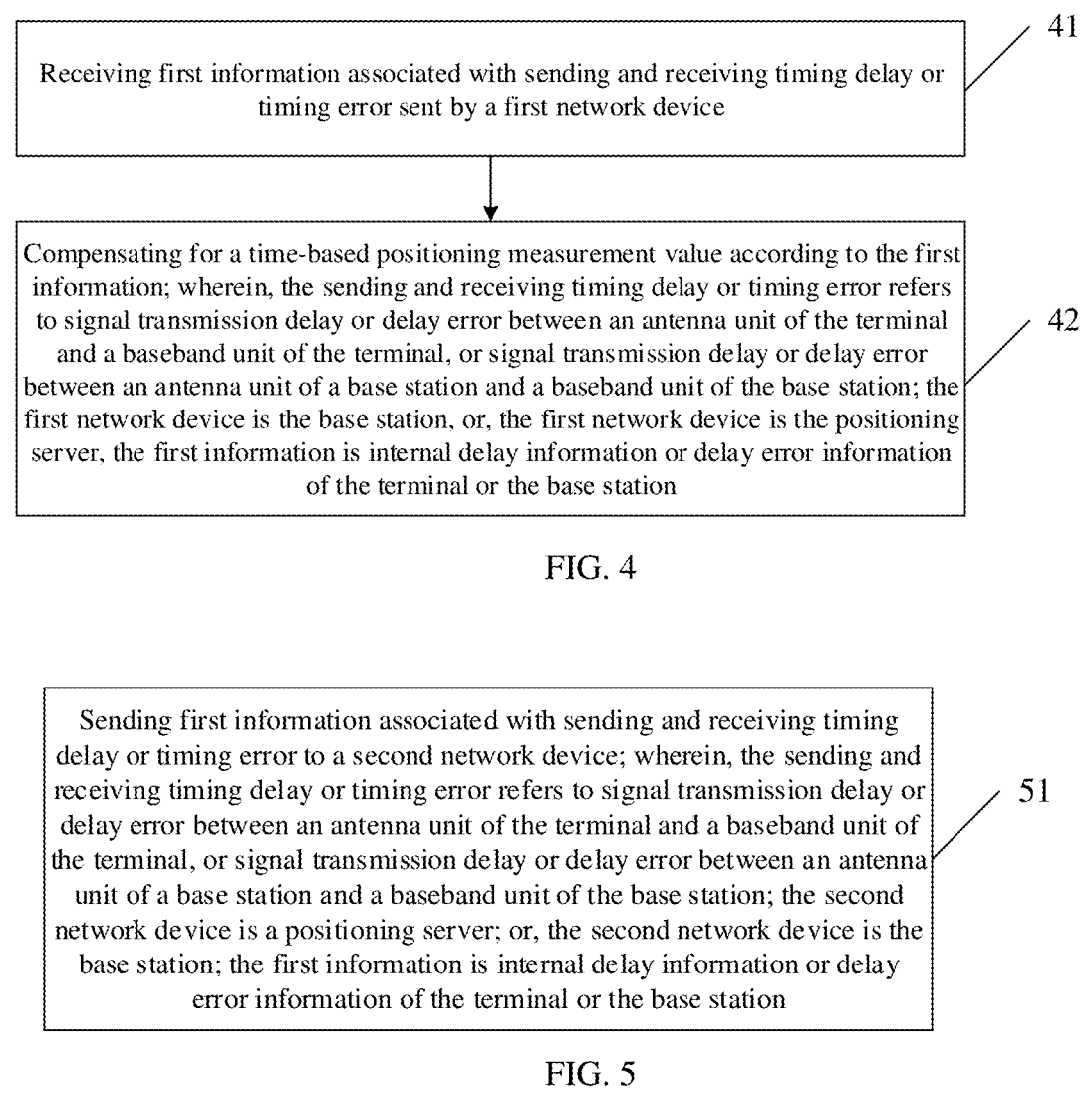

An embodiment of the present disclosure also provides an information processing method, which is applied to a terminal, as shown in FIG. 4, including:

Step 41: Receiving the first information associated with the sending and receiving timing delay or timing error sent by a first network device;

Step 42: Compensating for a time-based positioning measurement value according to the first information; wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station; the first network device is the base station, or, the first network device is the positioning server, the first information is internal delay information or delay error information of the terminal or the base station.

Wherein, when the first network device is the base station, the sending and receiving timing error may be measured by the base station (specifically, it may be measured by the first network device); when the first network device is a positioning server, the sending and receiving timing error may be measured by the terminal or the base station (forwarded by the first network device). The sending and receiving timing delay value may be an average value or a theoretical value of the sending and receiving timing delay, which is not limited here. The sending and receiving timing uncertainty information may be the degree information of the delay value (the sending and receiving timing) that deviates from the average delay value or the information about the standard deviation of the delay value (the sending and receiving timing), which is not limited here. The sending and receiving timing error may specifically refer to a signal transmission delay between the antenna unit of the base station from which the terminal can receive a positioning reference signal and the baseband unit of the base station. The first information may specifically correspond to at least two base stations. For example, three base stations send positioning reference signals to the UE. In this way, the first information may specifically include the sending and receiving timing delay value, receiving timing uncertainty information, receiving timing delay value, receiving timing uncertainty information, sending timing delay value, sending timing uncertainty information of each of the three base stations; and synchronization error information between two base stations of the three base stations, for example, the three base stations are A, B and C, then, the first information includes synchronization error information between base stations A and B, base stations A and C, and base stations B and C, synchronization error information of total three base stations. Specifically, the antenna unit may include at least one of a sending antenna unit and a receiving antenna unit.

The information processing method provided by the embodiment of the present disclosure receives the first information associated with the sending and receiving timing delay or timing error sent by the first network device; compensate for the time-based positioning measurement value according to the first information; wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station; the first network device is the base station, or, the first network device is the positioning server; the first information is internal delay information or delay error information of the terminal or the base station, it can realize that the information related to the UE or gNB sending and receiving timing error (or sending and receiving timing delay) is indicated, so as to assist the network device or UE to determine whether time-based positioning measurement value has a time measurement error (or time delay) and the specific value of the time measurement error (or time delay), so that the network device or UE can use the information to compensate or adjust the time-based positioning measurement value when computing the terminal position, so as to avoid the impact of the sending and receiving timing error on the terminal position calculation accuracy, improve the positioning accuracy of the system, and solve the problem in the related art that the sending and receiving timing error cannot be known and affect the positioning accuracy.

Wherein, the first information includes at least one of the following information: the sending and receiving timing delay value of the terminal or the base station; the sending and receiving timing uncertainty information of the terminal or the base station; the sending and receiving timing error value of the terminal or the base station value; the receiving timing delay value of the terminal or the base station; the receiving timing uncertainty information of the terminal or the base station; the receiving timing error value of the terminal or the base station; the sending timing delay value of the terminal or the base station; the sending timing uncertainty information of the terminal or the base station; the sending timing error value of the terminal or the base station; the synchronization error information between the base stations.

In an embodiment of the present disclosure, the antenna unit includes at least one of the following: an antenna, an antenna connector, an antenna port, or an antenna panel.

Wherein, the first information is product information or measurement information.

In the embodiment of the present disclosure, the first information corresponds to a preset parameter, and different preset parameters correspond to different first information; wherein, the preset parameters include at least one of the following: an antenna panel; an antenna; an antenna connector; an antenna port; a carrier; a frequency band; or an external environment parameter; the external environment parameter includes a temperature, an air pressure and/or an altitude.

Wherein, the time-based positioning measurement value includes at least one of the following: downlink reference signal time difference; uplink relative arrival time; terminal sending and receiving time difference; or base station sending and receiving time difference.

Wherein, the information included in the first information is transmitted by means of independent transmission or combined transmission; wherein, the independent transmission refers to that the information included in the first information is transmitted separately; the combined transmission refers to at least two items of information included in the first information are combined into one information for transmission.

Specifically, it can be understood that the information included in the first information is transmitted in a manner of independent transmission or combined transmission. The independent transmission refers to that the information included in the first information are separated transmitted in the form of a plurality of information, and the combined transmission refers to that at least two of the information included in the first information are combined together to be transmitted in a form of singular information (transmission can be sending or receiving).

In the embodiments of the present disclosure, the sending and receiving timing error value, the receiving timing error value and the sending timing error value all refer to residual timing error values after pre-calibration by the terminal or the base station.

In an embodiment of the present disclosure, the compensating for the time-based positioning measurement value according to the first information includes: subtracting an initial positioning measurement value from a value corresponding to the first information to obtain a compensated positioning measurement value.

Embodiment Three

An embodiment of the present disclosure also provides an information processing method, which is applied to a terminal, as shown in FIG. 5, including:

Step 51: Sending first information associated with sending and receiving timing delay or timing error to a second network device; wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station; the second network device is a positioning server; or, the second network device is the base station; the first information is internal delay information or delay error information of the terminal or the base station.

Wherein, the sending and receiving timing error may be measured by the terminal. The sending and receiving timing delay value may be an average value or a theoretical value of the sending and receiving timing delay, which is not limited here. The sending and receiving timing uncertainty information may be the degree information of the delay value (the sending and receiving timing) that deviates from the average delay value or the information about the standard deviation of the delay value (the sending and receiving timing), which is not limited here. The sending and receiving timing error may specifically refer to a signal transmission delay between the antenna unit of the base station from which the terminal can receive a positioning reference signal and the baseband unit of the base station. The first information may specifically correspond to at least two base stations. For example, three base stations send positioning reference signals to the UE. In this way, the first information may specifically include the sending and receiving timing delay value, receiving timing uncertainty information, receiving timing delay value, receiving timing uncertainty information, sending timing delay value, sending timing uncertainty information of each of the three base stations; and synchronization error information between two base stations of the three base stations, for example, the three base stations are A, B and C, then, the first information includes synchronization error information between base stations A and B, base stations A and C, and base stations B and C, synchronization error information of total three base stations. Specifically, the antenna unit may include at least one of a sending antenna unit and a receiving antenna unit.

The information processing method provided by the embodiments of the present disclosure sends the first information associated with the sending and receiving timing delay or timing error to the second network device; wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station; the second network device is a positioning server; or, the second network device is the base station; the first information is internal delay information or delay error information of the terminal or the base station, it can realize that the information related to the UE or gNB sending and receiving timing error (or sending and receiving timing delay) is indicated, so as to assist the network device or UE to determine whether time-based positioning measurement value has a time measurement error (or time delay) and the specific value of the time measurement error (or time delay), so that the network device or UE can use the information to compensate or adjust the time-based positioning measurement value when computing the terminal position, so as to avoid the impact of the sending and receiving timing error on the terminal position calculation accuracy, improve the positioning accuracy of the system, and solve the problem in the related art that the sending and receiving timing error cannot be known and affect the positioning accuracy.

Wherein, the first information includes at least one of the following information: the sending and receiving timing delay value of the terminal or the base station; the sending and receiving timing uncertainty information of the terminal or the base station; the sending and receiving timing error value of the terminal or the base station value; the receiving timing delay value of the terminal or the base station; the receiving timing uncertainty information of the terminal or the base station; the receiving timing error value of the terminal or the base station; the sending timing delay value of the terminal or the base station; the sending timing uncertainty information of the terminal or the base station; the sending timing error value of the terminal or the base station; the synchronization error information between the base stations.

In an embodiment of the present disclosure, the antenna unit includes at least one of the following: an antenna, an antenna connector, an antenna port, or an antenna panel.

Wherein, before sending the first information associated with the sending and receiving timing delay or timing error to the second network device, the method further includes: determining whether the terminal measures or sends the first information according to the configuration parameter.

In the embodiment of the present disclosure, the first information is product information or measurement information.

In the embodiment of the present disclosure, the first information is the measurement information, before the sending first information associated with sending and receiving timing delay or timing error to a second network device, the method further includes: sending a calibration measurement signal using a sending antenna unit of the terminal; receiving the calibration measurement signal using a receiving antenna unit of the terminal; determining the first information according to a sending time and a receiving time of the calibration measurement signal.

In the embodiment of the present disclosure, the first information corresponds to a preset parameter, and different preset parameters correspond to different first information; wherein, the preset parameters include at least one of the following: an antenna panel; an antenna; an antenna connector; an antenna port; a carrier; a frequency band; or an external environment parameter; the external environment parameter includes a temperature, an air pressure and/or an altitude.

Wherein, the information included in the first information is transmitted by means of independent transmission or combined transmission; wherein, the independent transmission refers to that the information included in the first information is transmitted separately; the combined transmission refers to at least two items of information included in the first information are combined into one information for transmission.

Specifically, it can be understood that the information included in the first information is transmitted in a manner of independent transmission or combined transmission. The independent transmission refers to that the information included in the first information are separated transmitted in the form of a plurality of information, and the combined transmission refers to that at least two of the information included in the first information are combined together to be transmitted in a form of singular information (transmission can be sending or receiving).

In the embodiments of the present disclosure, the sending and receiving timing error value, the receiving timing error value and the sending timing error value all refer to residual timing error values after pre-calibration by the terminal or the base station.

Embodiment Four

An embodiment of the present disclosure also provides an information processing method, which is applied to a second network device, as shown in FIG. 6, including:

Step 61: Receiving the first information associated with the sending and receiving timing delay or timing error sent by a first network device or a terminal;

Step 62: Compensating for a time-based positioning measurement value according to the first information; wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station; the first network device is the base station, the second network device is a positioning server; or, the first network device is the positioning server, and the second network device is the base station; the first information is internal delay information or delay error information of the terminal or the base station.

Wherein, corresponding to receiving the first information sent by the first network device: when the first network device is the base station, the sending and receiving timing error may be measured by the base station (specifically, it may be measured by the first network device); when the first network device is a positioning server, the sending and receiving timing error may be measured by the terminal or the base station (forwarded by the first network device). Corresponding to receiving the first information sent by the terminal, the sending and receiving timing error is measured by the terminal. The sending and receiving timing delay value may be an average value or a theoretical value of the sending and receiving timing delay, which is not limited here. The sending and receiving timing uncertainty information may be the degree information of the delay value (the sending and receiving timing) that deviates from the average delay value or the information about the standard deviation of the delay value (the sending and receiving timing), which is not limited here. The sending and receiving timing error may specifically refer to a signal transmission delay between the antenna unit of the base station from which the terminal can receive a positioning reference signal and the baseband unit of the base station. The first information may specifically correspond to at least two base stations. For example, three base stations send positioning reference signals to the UE. In this way, the first information may specifically include the sending and receiving timing delay value, receiving timing uncertainty information, receiving timing delay value, receiving timing uncertainty information, sending timing delay value, sending timing uncertainty information of each of the three base stations; and synchronization error information between two base stations of the three base stations, for example, the three base stations are A, B and C, then, the first information includes synchronization error information between base stations A and B, base stations A and C, and base stations B and C, synchronization error information of total three base stations. Specifically, the antenna unit may include at least one of a sending antenna unit and a receiving antenna unit.

The information processing method provided by the embodiment of the present disclosure receives the first information associated with the sending and receiving timing delay or timing error sent by the first network device or the terminal; compensate for the time-based positioning measurement value according to the first information; wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station; the first network device is the base station, the second network device is a positioning server; or, the first network device is the positioning server, and the second network device is the base station; the first information is internal delay information or delay error information of the terminal or the base station, it can realize that the information related to the UE or gNB sending and receiving timing error (or sending and receiving timing delay) is indicated, so as to assist the network device or UE to determine whether time-based positioning measurement value has a time measurement error (or time delay) and the specific value of the time measurement error (or time delay), so that the network device or UE can use the information to compensate or adjust the time-based positioning measurement value when computing the terminal position, so as to avoid the impact of the sending and receiving timing error on the terminal position calculation accuracy, improve the positioning accuracy of the system, and solve the problem in the related art that the sending and receiving timing error cannot be known and affect the positioning accuracy.

Wherein, the first information includes at least one of the following information: the sending and receiving timing delay value of the terminal or the base station; the sending and receiving timing uncertainty information of the terminal or the base station; the sending and receiving timing error value of the terminal or the base station value; the receiving timing delay value of the terminal or the base station; the receiving timing uncertainty information of the terminal or the base station; the receiving timing error value of the terminal or the base station; the sending timing delay value of the terminal or the base station; the sending timing uncertainty information of the terminal or the base station; the sending timing error value of the terminal or the base station; the synchronization error information between the base stations.

In the embodiment of the present disclosure, the first information is product information or measurement information.

In the embodiment of the present disclosure, the first information corresponds to a preset parameter, and different preset parameters correspond to different first information; wherein, the preset parameters include at least one of the following: an antenna panel; an antenna; an antenna connector; an antenna port; a carrier; a frequency band; or an external environment parameter; the external environment parameter includes a temperature, an air pressure and/or an altitude.

Wherein, the time-based positioning measurement value includes at least one of the following: downlink reference signal time difference; uplink relative arrival time; terminal sending and receiving time difference; or base station sending and receiving time difference.

Wherein, the information included in the first information is transmitted by means of independent transmission or combined transmission; wherein, the independent transmission refers to that the information included in the first information is transmitted separately; the combined transmission refers to at least two items of information included in the first information are combined into one information for transmission.

Specifically, it can be understood that the information included in the first information is transmitted in a manner of independent transmission or combined transmission. The independent transmission refers to that the information included in the first information are separated transmitted in the form of a plurality of information, and the combined transmission refers to that at least two of the information included in the first information are combined together to be transmitted in a form of singular information (transmission can be sending or receiving).

In the embodiments of the present disclosure, the sending and receiving timing error value, the receiving timing error value and the sending timing error value all refer to residual timing error values after pre-calibration by the terminal or the base station.

In an embodiment of the present disclosure, the compensating for the time-based positioning measurement value according to the first information includes: subtracting an initial positioning measurement value from a value corresponding to the first information to obtain a compensated positioning measurement value.

The information processing method provided by the embodiment of the present disclosure will be further described below in conjunction with multiple sides such as a terminal and a network device, and the positioning server is an LMF as an example.

In view of the above technical problems, the embodiments of the present disclosure provide an information processing method, which can be implemented as an indication method for sending and receiving timing error information (that is, the first information), which mainly involves: when reporting information or sending information, reporting or delivering the first information associated with the sending and receiving timing delay or timing error of the UE or the gNB at at least one network element among the UE (terminal), the gNB and the LMF. Among them, the reported information or delivered information includes at least one of Radio Resource Control (RRC) signaling, LTE Positioning Protocol (LPP) signaling, and NR Positioning Protocol A (NRPPa) signaling. Reporting means that UE sends a message to gNB or LMF, or gNB sends a message to LMF. Delivering means that the LMF sends a message to the UE or gNB, or the gNB sends a message to the UE.

Specifically, the solutions provided by the embodiments of the present disclosure involve:

1. Definition of First Information:

(1) the sending and receiving timing delay or timing error refers to the signal transmission delay or delay error between the antenna unit and the baseband unit of the UE or gNB.

(2) The first information refers to the information associated with the sending and receiving timing delay or timing error of the UE or gNB, including at least one of the following information content:

a) The Sending and Receiving Timing Error of the Terminal:

UE Receive (Rx)/Transmit (Tx) Timing Delay value;

UE Rx/Tx Timing Uncertainty information;

UE Rx Timing Delay value;

UE Rx Timing Uncertainty information;

UE Tx Timing Delay value;

UE Tx Timing Uncertainty information;

b) The Sending and Receiving Timing Error of the Base Station:

gNB Rx/Tx Timing Delay value;

gNB Rx/Tx Timing Uncertainty information;

gNB Rx Timing Delay value;

gNB Rx Timing Uncertainty information;

gNB Tx Timing Delay value;

gNB Tx Timing Uncertainty information.

c) Synchronization Error Information Between Base Stations.

Wherein, the antenna unit includes: at least one of an antenna, an antenna connector, an antenna port, and an antenna panel.

2. The Form of the First Information:

(3) Whether the UE can measure or report the first information is a kind of UE capability; corresponding to the determining whether the terminal can measure or send the first information according to the configuration parameter.

(4) If the UE has the capability to measure or report the first information, the UE will transmit the first information in the reported or delivered information; if the UE does not have the capability to measure or report the first information, the UE will not transmit the first information in the reported or delivered information.

(5) The first information is a product parameter of a UE or gNB (corresponding to the first information is product information), and its value is determined after the product leaves the factory.

(6) The first information is a measurement value (corresponding to the measurement information), and its value can be obtained by UE or gNB through internal measurement.

(7) The UE or gNB can obtain the value of the first information by spontaneously sending and receiving a reference signal and measuring the reference signal.

3. Factors Affecting the First Information:

(8) The first information is specific to the antenna panel, antenna, antenna connector or antenna port (Antenna-Panel-specific, Antenna-specific, Antenna-connector-specific, or Antenna-Port-specific), that is: for each antenna panel, antenna, antenna connector or antenna port, UE or gNB will report one value, the values for different antenna panels, antennas, antenna connectors or antenna ports may be different.

(9) The first information is specific to the Component Carrier or Band, that is, for each carrier or frequency band, the UE or gNB will report one value, the values may be different for different carriers or bands.

(10) The first information is related to external environmental factors such as temperature, air pressure, and altitude (i.e., the above-mentioned external environmental parameters).

4. Use of the First Information:

(11) For the UE-Assisted Positioning Scheme:

The UE and the gNB report the first information to the LMF for use when the LMF performs positioning calculations, and then use after compensating for the time-based positioning measurement (corresponding to the compensating for the time-based positioning measurement value according to the first information).

(12) For the UE-Based Positioning Scheme:

The gNB and the LMF send the first information to the UE for use when the UE performs positioning calculations, and then uses after compensating for the time-based positioning measurement value (corresponding to the compensating for the time-based positioning measurement value according to the first information).

(13) Time-based positioning measurements including at least one of the following:

Downlink Reference Signal Time Difference (DL RSTD);

Uplink Relative Time of Arrival (UL RTOA);

UE RX-Tx Time Difference;

gNB RX-Tx Time Difference.

The solutions provided by the embodiments of the present disclosure are illustrated below.

Example 1 (the First Information Includes the Sending and Receiving Timing Error of UE or gNB)

In the embodiments of the present disclosure, in reporting or delivering information, at least one network element among the UE, gNB and LMF reports or delivers the first information associated with the sending and receiving timing delay or timing error of the UE or the gNB.

The first information includes the following:

a) The Sending and Receiving Timing Error of the Terminal:

UE Rx/Tx Timing Delay value;

UE Rx/Tx Timing Uncertainty information;

b) The Sending and Receiving Timing Error Value of the Base Station;

gNB Rx/Tx Timing Delay value;

gNB Rx/Tx Timing Uncertainty information.

Figure 7:
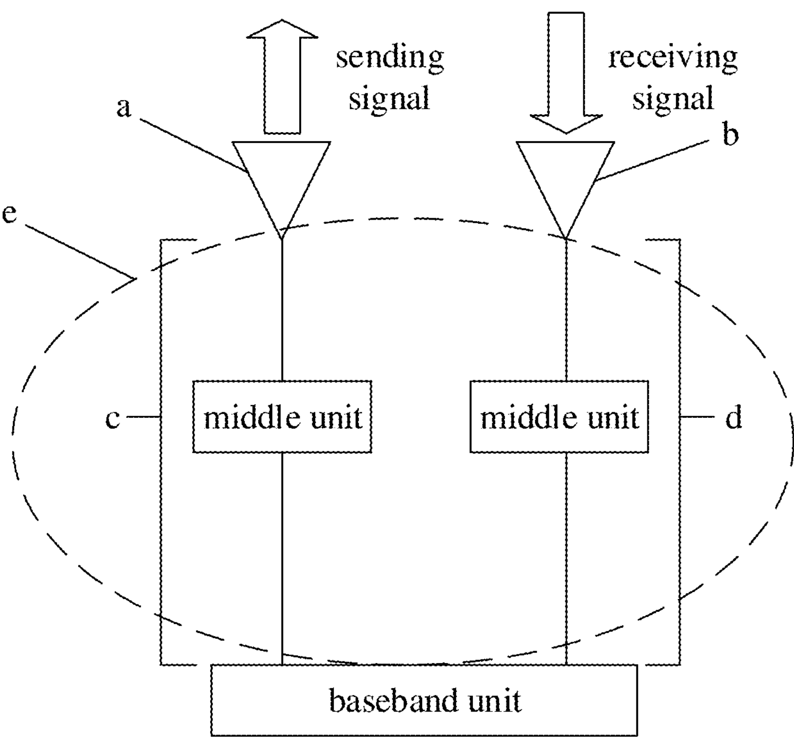
FIG. 7 is a first schematic diagram of first information according to an embodiment of the present disclosure.

As shown in FIG. 7 (the antenna unit takes the antenna port as an example, in the drawing, a represents the sending antenna port, b represents the receiving antenna port, c represents the sending and receiving timing error, d represents the receiving timing error, and e represents the sending and receiving timing error), the first information refers to the information associated with the sending and receiving timing error of the terminal or the base station, including sending and receiving timing delay (value) and transceiver timing uncertainty (information). Here, the sending and receiving timing error refers to the collection of sending timing error and receiving timing error. The so-called collection means that the sending and receiving timing error includes both the sending timing error part and the receiving timing error part. One possible form is: sending and receiving timing error=sending timing error+receiving timing error.

The sending timing error refers to the signal transmission time error from the baseband unit to the sending antenna unit, and the receiving timing error refers to the signal transmission time error from the receiving antenna unit to the baseband unit. Wherein, the antenna unit includes: at least one of an antenna, an antenna connector, an antenna port, or an antenna panel.

Wherein, the sending and receiving timing error of terminal may further include sending and receiving timing delay (value) of the terminal and sending and receiving timing uncertainty (information) of the terminal. The sending and receiving timing delay of terminal can refer to the average delay value of the error value, or the expected value of the error value (that is, the theoretical value); and the sending and receiving timing uncertainty of the terminal refers to the degree to which the error value deviates from the average delay value, or the standard deviation of the error values. The first information on the terminal side may specifically include at least one item of information such as the sending and receiving timing error of the terminal, the sending and receiving timing delay of the terminal, and the sending and receiving timing uncertainty of the terminal.

The sending and receiving timing error of the base station is also consistent with the above description. The first information on the base station side may specifically include at least one item of information such as the sending and receiving timing error of the base station, the sending and receiving timing delay of the base station, and the sending and receiving timing uncertainty of the base station.

Using the method in this example, the LMF or UE can be assisted in determining whether there is a time measurement error in the time-based positioning measurement value and the specific value of the error by indicating information related to the sending and receiving timing error of the UE or gNB, so that the LMF or UE can use the information, parameter or measurement value to compensate or adjust the time-based positioning measurement value when calculating the terminal position, thereby avoiding the impact of the sending and receiving timing error on the terminal position calculation accuracy, improving the system positioning accuracy.

Example 2 (the First Information Includes Receiving Timing Error and Sending Timing Error of the UE or gNB)

In the embodiments of the present disclosure, in reporting information or delivering information, at least one network element among UE, gNB and LMF reports or delivers first information associated with sending and receiving timing delay or timing error of UE or gNB.

The first information includes the following:

a) Sending or Receiving Timing Error of the Terminal:
 UE Rx Timing Delay value;
 UE Rx Timing Uncertainty information;
 UE Tx Timing Delay value;
 UE Tx Timing Uncertainty information;

b) Sending or Receiving Timing Error of the Base Station:
 gNB Rx Timing Delay value;
 gNB Rx Timing Uncertainty information;
 gNB Tx Timing Delay value;
 gNB Tx Timing Uncertainty information.

Figure 8:
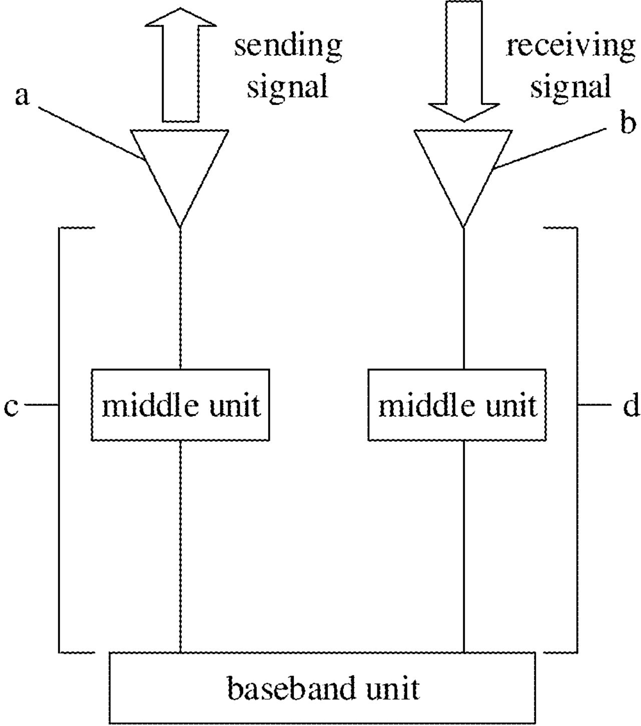
FIG. 8 is a second schematic diagram of the first information according to an embodiment of the present disclosure.

As shown in FIG. 8 (the antenna unit is taken as an example of an antenna port, in the drawing, a represents the sending antenna port, b represents the receiving antenna port, c represents the sending timing error, and d represents the receiving timing error), the first information refers to the information associated with the sending or receive timing error of the terminal or the base station, including sending or receiving timing delay (value) and sending or receiving timing uncertainty (information). Here, the sending and receiving timing error refers to a single sending timing error or a single receiving timing error.

The sending timing error refers to the signal transmission time error from the baseband unit to the sending antenna unit, and the receiving timing error refers to the signal transmission time error from the receiving antenna unit to the baseband unit. Wherein, the antenna unit includes: at least one of an antenna, an antenna connector, an antenna port, or an antenna panel.

Wherein, the terminal sending timing error may further include terminal sending timing delay (value) and terminal sending timing uncertainty (information). The terminal sending timing delay can refer to the average delay value of the error value, or the expected value of the error value (that is, the theoretical value); and the terminal sending timing uncertainty refers to the degree to which the error value deviates from the average delay value, or the standard deviation of the error values. The first information on the terminal sending side may specifically include at least one item of information such as terminal sending timing error, terminal sending timing delay, and terminal sending timing uncertainty. The first information on the receiving side of the terminal may specifically include at least one item of information such as terminal receiving timing error, terminal receiving timing delay, and terminal receiving timing uncertainty.

The base station sending and receiving timing error is also consistent with the above description. The first information on the base station sending side may specifically include at least one item of information such as base station sending timing error, base station sending timing delay, and base station sending timing uncertainty. The first information on the receiving side of the base station may specifically include at least one item of information such as base station receiving timing error, base station receiving timing delay, and base station receiving timing uncertainty.

Using the method in this example, the LMF or UE can be assisted in determining whether there is a time measurement error in the time-based positioning measurement value and the specific value of the error by indicating information related to the sending and receiving timing error of the UE or gNB, so that the LMF or UE can use this information, parameter or measurement value to compensate or adjust the time-based positioning measurement value when calculating the terminal position, thereby avoiding the impact of the sending and receiving timing error on the terminal position calculation accuracy, and improving the system positioning accuracy. In addition, the sending timing error and the receiving timing error in the sending and receiving timing error here can be delivered or reported separately, so that the LMF or UE can flexibly use the first information during the positioning calculation.

Example 3 (the First Information is Associated with a UE Capability)

In the embodiments of the present disclosure, in reporting information or delivering information, at least one network element among UE, gNB and LMF reports or delivers the first information associated with sending and receiving timing delay or timing error of UE or gNB.

Whether the UE can measure or report the first information is a kind of UE capability.

If the UE has the capability to measure or report the first information, the UE will transmit the first information in the reporting or delivering information; if the UE does not have the capability to measure or report the first information, the UE will not transmit the first information in the reporting or delivering information.

Specifically, for UEs, limited by cost and complexity, not all UEs have the same measurement or reporting capabilities, and some low-cost UEs only have relatively simple functions and can only measure or report limited information. The first information is the information associated with the sending and receiving timing delay or timing error of UE or gNB, which is used to assist the LMF or UE to improve the positioning accuracy in the positioning calculation, so some UEs may not have the capability to measure or report the first information, therefore, whether the UE can measure or report the first information is a kind of UE capability.

Using the method in this example, whether the UE can measure or report the first information is a kind of UE capability. In this way, for a UE capable of measuring or reporting the first information, the first information may be measured or reported, thereby assisting the LMF or the UE to improve positioning accuracy in positioning calculation. However, for a low-cost UE, this capability may not be required, thereby reducing the cost and complexity of the UE.

Example 4 (the First Information is Specifically a Product Parameter)

In the embodiments of the present disclosure, in reporting information or delivering information, at least one network element among UE, gNB and LMF reports or delivers first information associated with sending and receiving timing delay or timing error of UE or gNB.

The first information is a product parameter of a UE or gNB, and its value is determined after the product leaves the factory.

Specifically, the first information may be a relatively fixed product parameter, the value of which is determined after the product leaves the factory, and does not require subsequent measurement to obtain the value. In addition, the first information may have multiple candidate values, and the user may set an appropriate value according to various factors for use. For example, in a low temperature environment, the value of the first information is X1, and in a high temperature environment, the value of the first information is X2.

Using the method in this example, the first information is a product parameter of a UE or gNB, and its value is determined after the product leaves the factory. In this way, it becomes very simple and convenient for the UE or gNB to obtain the value of the first information, complex operations are not necessary, the UE or gNB can easily obtain the value of the first information, and report or deliver the same to the LMF or UE, thereby improving the accuracy of positioning calculations.

Example 5 (the First Information is Specifically a New Measurement Value)

In the embodiments of the present disclosure, in reporting information or delivering information, at least one network element among UE, gNB and LMF reports or delivers first information associated with sending and receiving timing delay or timing error of UE or gNB.

The first information is a measurement value, the value of which is obtained by UE or gNB through the internal measurement.

The first information is a measurement value, and its definition is as follow. The first information refers to the information associated with the sending and receiving timing error of the terminal or base station, including the sending and receiving timing delay (value) and the sending and receiving timing uncertainty (information). Here, the sending and receiving timing error refers to the collection of sending timing error and receiving timing error. The so-called collection means that the sending and receiving timing error includes both the sending timing error part and the receiving timing error part. One possible form is: sending and receiving timing error=sending timing error+receiving timing error.

In addition, as the measurement value, the first information may also refer to information associated with the sending or receiving timing error of the terminal or base station, including sending or receiving timing delay (value) and sending or receiving timing uncertainty (information). Here, the sending and receiving timing error refers to a single sending timing error or a single receiving timing error.

The sending timing error in the above description refers to the signal transmission time error from the baseband unit to the sending antenna unit, and the receiving timing error refers to the signal transmission time error from the receiving antenna unit to the baseband unit. Wherein, the antenna unit includes: at least one of an antenna, an antenna connector, an antenna port, or an antenna panel.

Figure 9:
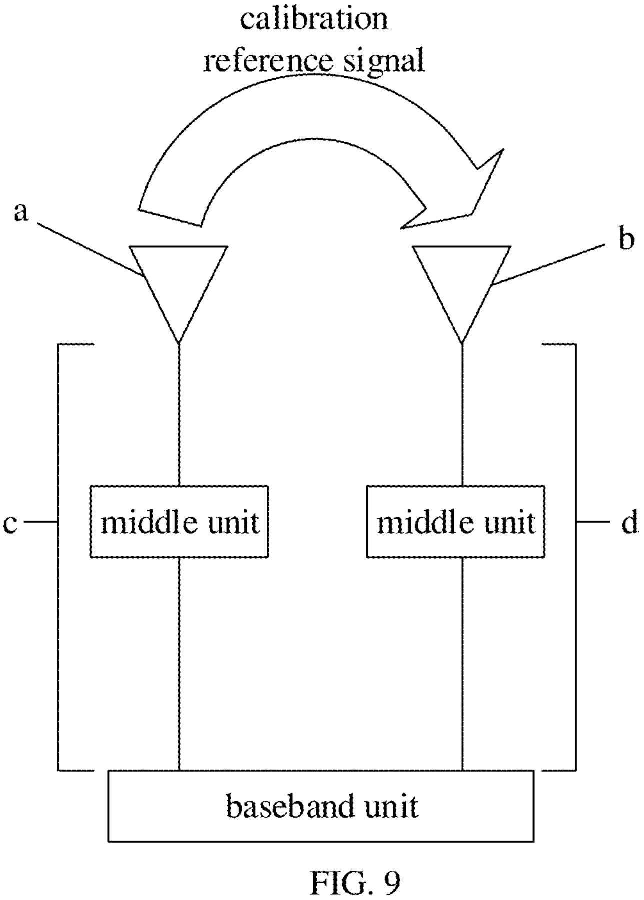
FIG. 9 is a schematic diagram of obtaining the first information according to an embodiment of the present disclosure.

When the first information is a measurement value, the UE or gNB can obtain the value thereof through own internal measurement. One implementation method is that the UE or gNB obtains the value of the first information by spontaneously sending and receiving the calibration reference signal (corresponding to the calibration measurement signal), as shown in FIG. 9 (the antenna unit takes the antenna port as an example, and a indicates the sending antenna port, b indicates receiving antenna port, c indicates sending timing error, d indicates receiving timing error), UE or gNB sends a calibration reference signal from the sending antenna unit, and then receives the calibration reference signal from its own receiving antenna unit, so that it can accurately measure the specific value of the first information in real time.

Using the method in this example, the first information is a measurement value of the UE or gNB, and the value is obtained by the UE or gNB through its own internal measurement. The value of the first information obtained in this way is relatively accurate, and can reflect the specific value of the current sending and receiving timing error in real time, so that after reporting or delivering to the LMF or UE, it is beneficial to improve the accuracy of positioning calculation.

Example 6 (Factors Affecting the First Information)

In the embodiments of the present disclosure, in reporting information or delivering information, at least one network element among UE, gNB and LMF reports or delivers first information associated with sending and receiving timing delay or timing error of UE or gNB.

The first information is specific for antenna panel, antenna, antenna connector or antenna port (Antenna-Panel-specific, Antenna-specific, Antenna-Connector-specificifi or Antenna-Port-specific), i.e.: for each antenna panel, antenna, antenna connector or antenna port, UE or gNB will report a value, which may be different for different antenna panels, antennas, antenna connectors or antenna ports.

The first information is specific to a Component Carrier or a Band, that is, for each carrier or band, the UE or gNB will report a value, which may be different for different carriers or bands.

The first information is related to external environmental factors such as temperature, air pressure, and altitude.

Specifically, for a UE or gNB, multiple sending or receiving antenna panels, antennas, antenna connectors, and antenna ports may be configured, and different antenna panels, antennas, antenna connectors, and antenna ports mean that there will be different signal channels from the baseband unit to the antenna panel, antenna, antenna connector or antenna port when sending or receiving the signal, and there will be different sending and receiving timing errors, so for each antenna panel, antenna, antenna connector or antenna port, UE or gNB will report one value, and the values corresponding to different antenna panels, antennas, antenna connectors or antenna ports may be different.

As for the carrier and band, the situation is similar. Even for the same antenna panel, antenna, antenna connector and antenna port, when the UE or gNB works on different carriers or bands, there will be different sending and receiving timing errors, so for each carrier or band, UE or gNB will report one value, the values may be different for different carriers or bands.

Using the method in this example, different antenna panels, antennas, antenna connectors, antenna ports, carriers, bands and other factors can be used to indicate different sending and receiving timing error information to assist LMF or UE to perform different compensation or processing on the sending and receiving timing error in positioning calculations for different situations. Since the influence of different antenna panels, antennas, antenna connectors, antenna ports, carriers, bands and other factors on the sending and receiving timing error is considered, the positioning accuracy of the system is improved.

Example 7 (Using the First Information)

In the embodiments of the present disclosure, in reporting information or delivering information, at least one network element among UE, gNB and LMF reports or delivers the first information associated with sending and receiving timing delay or timing error of UE or gNB.

Regarding the usage plan after the first information is reported to the LMF or delivered to the UE:

For the UE-assisted positioning solution, the UE and the gNB report the first information to the LMF for use when the LMF performs positioning calculations and compensates the time-based positioning measurement values.

For the UE-based positioning scheme, the gNB and the LMF send the first information to the UE for the UE to use after compensation processing of the time-based positioning measurement when performing positioning calculations.

Time-based positioning measurements include: DL RSTD, UL RTOA, UE Rx-Tx Time Difference, gNB RX-Tx Time Difference.

Using the method in this example, different signaling procedures can be used to transmit the sending and receive timing error information for different positioning schemes, so as to assist LMF or UE to compensate for or process the sending and receiving timing error for different positioning schemes when performing positioning calculations, thereby improving the positioning accuracy of the system.

It can be seen from the above that the solution provided by the embodiment of the present disclosure relates to an indication method for sending and receiving timing error information. The indication method of the sending and receiving timing error information of the UE or gNB proposed in this solution can indicate information, parameters or measurement value related to the sending and receiving timing error of the UE or gNB, to assist the LMF or UE to determine whether there is a time measurement error in the time-based positioning measurement and the specific value of the error, so that the LMF or UE can use the information, parameters or measurement values to compensate for or adjust the time-based positioning measurement value when calculating the terminal position, to avoid the impact of the sending and receiving timing error on the terminal position calculation accuracy, thereby improving the positioning accuracy of the system.

It should be noted here, sending and receiving timing delay may refer to the relevant description about the sending and receiving timing error, and details will not be repeated here.

Figure 10:
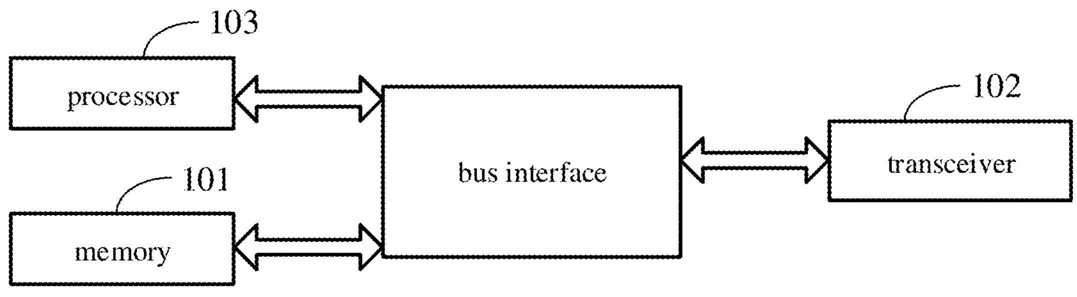
FIG. 10 is a first structural schematic diagram of a network device according to an embodiment of the present disclosure.

An embodiment of the present disclosure also provides a network device, the network device is a first network device, as shown in FIG. 10, including a memory 101, a transceiver 102, and a processor 103:

The memory 101 is used to store computer programs; the transceiver 102 is used to send and receive data under the control of the processor 103; the processor 103 is used to read the computer programs in the memory 101 and perform the following operations:

Sending first information associated with sending and receiving timing delay or timing error to a terminal and/or a second network device through the transceiver 102;

wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station;

the first network device is the base station, the second network device is a positioning server; or, the first network device is the positioning server, and the second network device is the base station;

the first information is internal delay information or delay error information of the terminal or the base station.

The network device provided by the embodiments of the present disclosure sends the first information associated with the sending and receiving timing delay or timing error to the terminal and/or the second network device; wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station; the first network device is the base station, the second network device is a positioning server; or, the first network device is the positioning server, and the second network device is the base station; the first information is internal delay information or delay error information of the terminal or the base station, it can realize that the information related to the UE or gNB sending and receiving timing error (or sending and receiving timing delay) is indicated, so as to assist the network device or UE to determine whether time-based positioning measurement value has a time measurement error (or time delay) and the specific value of the time measurement error (or time delay), so that the network device or UE can use the information to compensate or adjust the time-based positioning measurement value when computing the terminal position, so as to avoid the impact of the sending and receiving timing error on the terminal position calculation accuracy, improve the positioning accuracy of the system, and solve the problem in the related art that the sending and receiving timing error cannot be known and affect the positioning accuracy.

Specifically, the transceiver 102 is configured to receive and send data under the control of the processor 103.

Wherein, in FIG. 10, the bus architecture may include any number of interconnected buses and bridges, specifically various circuits of one or more processors represented by the processor 103 and the memory represented by the memory 101 are linked together. The bus architecture can also link together various other circuits such as peripherals, voltage regulators, and power management circuits, etc., which are well known in the art and therefore will not be further described herein. The bus interface provides the interface. Transceiver 102 may be a plurality of elements, including a transmitter and a receiver, providing a unit for communicating with various other devices over transmission medium, including wireless channels, wired channels, optical cables, and other transmission medium. The processor 103 is responsible for managing the bus architecture and general processing, and the memory 101 can store data used by the processor 103 when performing operations.

The processor 103 may be a central processing unit (CPU), an application specific integrated circuit (ASIC), a field programmable gate array (FPGA) or a complex programmable logic device (CPLD), the processor can also adopt a multi-core architecture.

Wherein, the first information includes at least one of the following information: the sending and receiving timing delay value of the terminal or the base station; the sending and receiving timing uncertainty information of the terminal or the base station; the sending and receiving timing error value of the terminal or the base station value; the receiving timing delay value of the terminal or the base station; the receiving timing uncertainty information of the terminal or the base station; the receiving timing error value of the terminal or the base station; the sending timing delay value of the terminal or the base station; the sending timing uncertainty information of the terminal or the base station; the sending timing error value of the terminal or the base station; the synchronization error information between the base stations.

In an embodiment of the present disclosure, the antenna unit includes at least one of the following: an antenna, an antenna connector, an antenna port, or an antenna panel.

Wherein, the first information is product information or measurement information.

In the embodiment of the present disclosure, in the case that the first information is the measurement information, and the first network device is the base station, the operation further includes: before the sending first information associated with sending and receiving timing delay or timing error to a terminal and/or a second network device, sending a calibration measurement signal using a sending antenna unit of the first network device; receiving the calibration measurement signal using a receiving antenna unit of the first network device; determining the first information according to a sending time and a receiving time of the calibration measurement signal.

Wherein, in the case that the first information is the measurement information, and the first network device is a positioning server, the operation further includes: before the sending first information associated with sending and receiving timing delay or timing error to a terminal and/or a second network device, receiving the first information sent by the terminal or the base station.

In the embodiment of the present disclosure, the first information corresponds to a preset parameter, and different preset parameters correspond to different first information; wherein, the preset parameters include at least one of the following: an antenna panel; an antenna; an antenna connector; an antenna port; a carrier; a frequency band; or an external environment parameter; the external environment parameter includes a temperature, an air pressure and/or an altitude.

Wherein, the information included in the first information is transmitted by means of independent transmission or combined transmission; wherein, the independent transmission refers to that the information included in the first information is transmitted separately; the combined transmission refers to at least two items of information included in the first information are combined into one information for transmission.

In the embodiments of the present disclosure, the sending and receiving timing error value, the receiving timing error value and the sending timing error value all refer to residual timing error values after pre-calibration by the terminal or the base station.

What needs to be explained here is that the network device provided by the embodiments of the present disclosure can implement all the method steps implemented by the method embodiment in the first embodiment, and can achieve the same technical effect. The same parts and beneficial effects as those in the method embodiment will not be described in detail.

Figure 11:
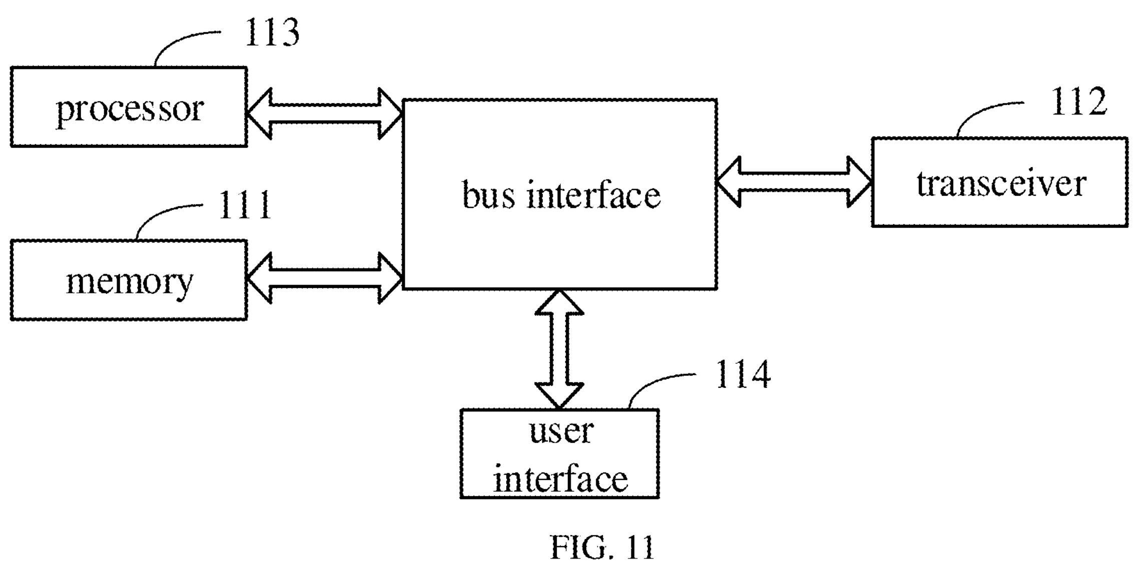
FIG. 11 is a first structural schematic diagram of a terminal according to an embodiment of the present disclosure.

An embodiment of the present disclosure also provides a terminal, as shown in FIG. 11, including a memory 111, a transceiver 112, and a processor 113:

The memory 111 is used to store computer programs; the transceiver 112 is used to send and receive data under the control of the processor 113; the processor 113 is used to read the computer programs in the memory 111 and perform the following operations:

Receiving the first information associated with the sending and receiving timing delay or timing error sent by a first network device through the transceiver 112;

Compensating for a time-based positioning measurement value according to the first information; wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station;

the first network device is the base station, or, the first network device is the positioning server, the first information is internal delay information or delay error information of the terminal or the base station.

The terminal provided by the embodiment of the present disclosure receives the first information associated with the sending and receiving timing delay or timing error sent by the first network device; compensate for the time-based positioning measurement value according to the first information; wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station; the first network device is the base station, or, the first network device is the positioning server; the first information is internal delay information or delay error information of the terminal or the base station, it can realize that the information related to the UE or gNB sending and receiving timing error (or sending and receiving timing delay) is indicated, so as to assist the network device or UE to determine whether time-based positioning measurement value has a time measurement error (or time delay) and the specific value of the time measurement error (or time delay), so that the network device or UE can use the information to compensate or adjust the time-based positioning measurement value when computing the terminal position, so as to avoid the impact of the sending and receiving timing error on the terminal position calculation accuracy, improve the positioning accuracy of the system, and solve the problem in the related art that the sending and receiving timing error cannot be known and affect the positioning accuracy.

Specifically, the transceiver 112 is configured to receive and send data under the control of the processor 113.

Wherein, in FIG. 11, the bus architecture may include any number of interconnected buses and bridges, specifically various circuits of one or more processors represented by the processor 113 and the memory represented by the memory 111 are linked together. The bus architecture can also link together various other circuits such as peripherals, voltage regulators, and power management circuits, etc., which are well known in the art and therefore will not be further described herein. The bus interface provides the interface. Transceiver 112 may be a plurality of elements, including a transmitter and a receiver, providing a means for communicating with various other devices over transmission medium, including wireless channels, wired channels, fiber optic cables, etc. For different user equipments, the user interface 114 may also be an interface capable of connecting externally and internally to required equipment, and the connected equipment includes but not limited to a keypad, a display, a speaker, a microphone, a joystick, and the like.

The processor 113 is responsible for managing the bus architecture and general processing, and the memory 111 can store data used by the processor 113 when performing operations.

Optionally, the processor 113 may be a CPU, ASIC, FPGA or CPLD, and the processor may also adopt a multi-core architecture.

The processor is used to execute any one of the methods provided by the embodiments of the present disclosure according to the obtained executable instructions by calling the computer program stored in the memory. The processor and memory may also be physically separated.

Wherein, the first information includes at least one of the following information: the sending and receiving timing delay value of the terminal or the base station; the sending and receiving timing uncertainty information of the terminal or the base station; the sending and receiving timing error value of the terminal or the base station value; the receiving timing delay value of the terminal or the base station; the receiving timing uncertainty information of the terminal or the base station; the receiving timing error value of the terminal or the base station; the sending timing delay value of the terminal or the base station; the sending timing uncertainty information of the terminal or the base station; the sending timing error value of the terminal or the base station; the synchronization error information between the base stations.

In an embodiment of the present disclosure, the antenna unit includes at least one of the following: an antenna, an antenna connector, an antenna port, or an antenna panel.

Wherein, the first information is product information or measurement information.

In the embodiment of the present disclosure, the first information corresponds to a preset parameter, and different preset parameters correspond to different first information; wherein, the preset parameters include at least one of the following: an antenna panel; an antenna; an antenna connector; an antenna port; a carrier; a frequency band; or an external environment parameter; the external environment parameter includes a temperature, an air pressure and/or an altitude.

Wherein, the time-based positioning measurement value includes at least one of the following: downlink reference signal time difference; uplink relative arrival time; terminal sending and receiving time difference; or base station sending and receiving time difference.

Wherein, the information included in the first information is transmitted by means of independent transmission or combined transmission; wherein, the independent transmission refers to that the information included in the first information is transmitted separately; the combined transmission refers to at least two items of information included in the first information are combined into one information for transmission.

Wherein, the sending and receiving timing error value, the receiving timing error value and the transmitting timing error value all refer to residual timing error values after pre-calibration by the terminal or the base station.

In an embodiment of the present disclosure, the compensating the time-based positioning measurement value according to the first information includes: subtracting a value corresponding to the first information from an initial positioning measurement value to obtain the compensated positioning measurement.

It should be noted here that the terminal provided by the embodiment of the present disclosure can implement all the method steps implemented by the method embodiment in the embodiment 2, and can achieve the same technical effect. The same parts and beneficial effects of the method embodiments are not described in detail.

Figure 12:
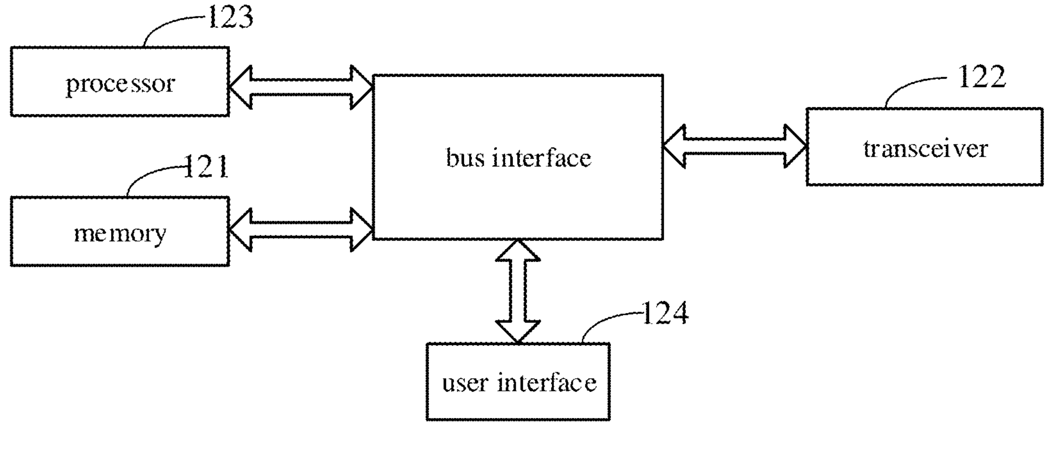
FIG. 12 is a second structural schematic diagram of a terminal according to an embodiment of the present disclosure.

An embodiment of the present disclosure also provides a terminal, as shown in FIG. 12, including a memory 121, a transceiver 122, and a processor 123:

The memory 121 is used to store computer programs; the transceiver 122 is used to send and receive data under the control of the processor 123; the processor 123 is used to read the computer programs in the memory 121 and perform the following operations:

Sending first information associated with sending and receiving timing delay or timing error to a second network device through the transceiver 122;

wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station;

the second network device is a positioning server; or, the second network device is the base station;

the first information is internal delay information or delay error information of the terminal or the base station.

The terminal provided by the embodiments of the present disclosure sends the first information associated with the sending and receiving timing delay or timing error to the second network device; wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station; the second network device is a positioning server; or, the second network device is the base station; the first information is internal delay information or delay error information of the terminal or the base station, it can realize that the information related to the UE or gNB sending and receiving timing error (or sending and receiving timing delay) is indicated, so as to assist the network device or UE to determine whether time-based positioning measurement value has a time measurement error (or time delay) and the specific value of the time measurement error (or time delay), so that the network device or UE can use the information to compensate or adjust the time-based positioning measurement value when computing the terminal position, so as to avoid the impact of the sending and receiving timing error on the terminal position calculation accuracy, improve the positioning accuracy of the system, and solve the problem in the related art that the sending and receiving timing error cannot be known and affect the positioning accuracy.

Specifically, the transceiver 122 is configured to receive and send data under the control of the processor 123.

Wherein, in FIG. 12, the bus architecture may include any number of interconnected buses and bridges, specifically various circuits of one or more processors represented by the processor 123 and the memory represented by the memory 121 are linked together. The bus architecture can also link together various other circuits such as peripherals, voltage regulators, and power management circuits, etc., which are well known in the art and therefore will not be further described herein. The bus interface provides the interface. Transceiver 122 may be a plurality of elements, including a transmitter and a receiver, providing a means for communicating with various other devices over transmission medium, including wireless channels, wired channels, fiber optic cables, etc. For different user equipments, the user interface 124 may also be an interface capable of connecting externally and internally to required equipment, and the connected equipment includes but not limited to a keypad, a display, a speaker, a microphone, a joystick, and the like.

The processor 123 is responsible for managing the bus architecture and general processing, and the memory 121 can store data used by the processor 123 when performing operations.

Optionally, the processor 123 may be a CPU, ASIC, FPGA or CPLD, and the processor may also adopt a multi-core architecture.

The processor is used to execute any one of the methods provided by the embodiments of the present disclosure according to the obtained executable instructions by calling the computer program stored in the memory. The processor and memory may also be physically separated.

Wherein, the first information includes at least one of the following information: the sending and receiving timing delay value of the terminal or the base station; the sending and receiving timing uncertainty information of the terminal or the base station; the sending and receiving timing error value of the terminal or the base station value; the receiving timing delay value of the terminal or the base station; the receiving timing uncertainty information of the terminal or the base station; the receiving timing error value of the terminal or the base station; the sending timing delay value of the terminal or the base station; the sending timing uncertainty information of the terminal or the base station; the sending timing error value of the terminal or the base station; the synchronization error information between the base stations.

In an embodiment of the present disclosure, the antenna unit includes at least one of the following: an antenna, an antenna connector, an antenna port, or an antenna panel.

Wherein, the operation further includes: before sending the first information associated with the sending and receiving timing delay or timing error to the second network device, determining whether the terminal measures or sends the first information according to the configuration parameter.

In the embodiment of the present disclosure, the first information is product information or measurement information.

In the embodiment of the present disclosure, the first information is the measurement information, before the sending first information associated with sending and receiving timing delay or timing error to a second network device, the method further includes: sending a calibration measurement signal using a sending antenna unit of the terminal; receiving the calibration measurement signal using a receiving antenna unit of the terminal; determining the first information according to a sending time and a receiving time of the calibration measurement signal.

In the embodiment of the present disclosure, the first information corresponds to a preset parameter, and different preset parameters correspond to different first information; wherein, the preset parameters include at least one of the following: an antenna panel; an antenna; an antenna connector; an antenna port; a carrier; a frequency band; or an external environment parameter; the external environment parameter includes a temperature, an air pressure and/or an altitude.

Wherein, the information included in the first information is transmitted by means of independent transmission or combined transmission; wherein, the independent transmission refers to that the information included in the first information is transmitted separately; the combined transmission refers to at least two items of information included in the first information are combined into one information for transmission.

In the embodiments of the present disclosure, the sending and receiving timing error value, the receiving timing error value and the sending timing error value all refer to residual timing error values after pre-calibration by the terminal or the base station.

It should be noted here that the terminal provided by the embodiments of the present disclosure can implement all the method steps implemented by the method embodiment in the third embodiment, and can achieve the same technical effect. The same parts and beneficial effects of the method embodiments are not described in detail.

Figure 13:
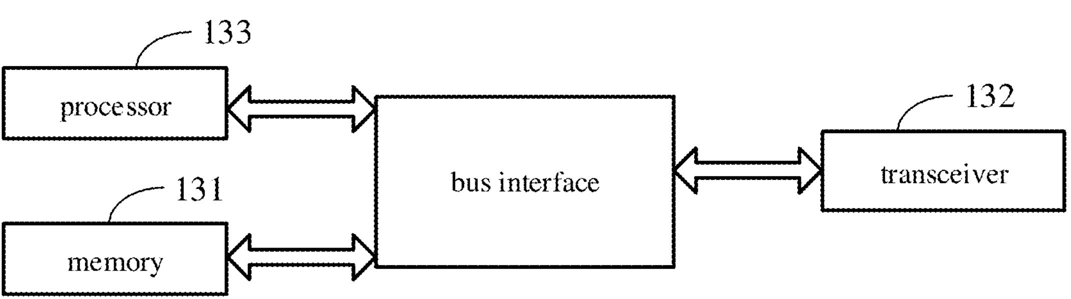
FIG. 13 is a second structural schematic diagram of the network device according to an embodiment of the present disclosure.

An embodiment of the present disclosure also provides a network device, the network device is a second network device, as shown in FIG. 13, including a memory 131, a transceiver 132, and a processor 133:

The memory 131 is used to store computer programs; the transceiver 132 is used to send and receive data under the control of the processor 133; the processor 133 is used to read the computer programs in the memory 131 and perform the following operations:

Receiving the first information associated with sending and receiving timing delay or timing error sent by a first network device or a terminal through the transceiver 132;

Compensating for a time-based positioning measurement value according to the first information;

wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station;

the first network device is the base station, the second network device is a positioning server; or, the first network device is the positioning server, and the second network device is the base station;

the first information is internal delay information or delay error information of the terminal or the base station.

The network device provided by the embodiment of the present disclosure receives the first information associated with the sending and receiving timing delay or timing error sent by the first network device or the terminal; compensate for the time-based positioning measurement value according to the first information; wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station; the first network device is the base station, the second network device is a positioning server; or, the first network device is the positioning server, and the second network device is the base station; the first information is internal delay information or delay error information of the terminal or the base station, it can realize that the information related to the UE or gNB sending and receiving timing error (or sending and receiving timing delay) is indicated, so as to assist the network device or UE to determine whether time-based positioning measurement value has a time measurement error (or time delay) and the specific value of the time measurement error (or time delay), so that the network device or UE can use the information to compensate or adjust the time-based positioning measurement value when computing the terminal position, so as to avoid the impact of the sending and receiving timing error on the terminal position calculation accuracy, improve the positioning accuracy of the system, and solve the problem in the related art that the sending and receiving timing error cannot be known and affect the positioning accuracy.

Specifically, the transceiver 132 is configured to receive and send data under the control of the processor 133.

Wherein, in FIG. 13, the bus architecture may include any number of interconnected buses and bridges, specifically various circuits of one or more processors represented by the processor 133 and the memory represented by the memory 131 are linked together. The bus architecture can also link together various other circuits such as peripherals, voltage regulators, and power management circuits, etc., which are well known in the art and therefore will not be further described herein. The bus interface provides the interface. Transceiver 132 may be a plurality of elements, including a transmitter and a receiver, providing a unit for communicating with various other devices over transmission medium, including wireless channels, wired channels, optical cables, and other transmission medium. The processor 133 is responsible for managing the bus architecture and general processing, and the memory 131 can store data used by the processor 133 when performing operations.

The processor 133 may be a CPU, ASIC, FPGA or CPLD, and the processor may also adopt a multi-core architecture.

Wherein, the first information includes at least one of the following information: the sending and receiving timing delay value of the terminal or the base station; the sending and receiving timing uncertainty information of the terminal or the base station; the sending and receiving timing error value of the terminal or the base station value; the receiving timing delay value of the terminal or the base station; the receiving timing uncertainty information of the terminal or the base station; the receiving timing error value of the terminal or the base station; the sending timing delay value of the terminal or the base station; the sending timing uncertainty information of the terminal or the base station; the sending timing error value of the terminal or the base station; the synchronization error information between the base stations.

In the embodiment of the present disclosure, the first information is product information or measurement information.

In the embodiment of the present disclosure, the first information corresponds to a preset parameter, and different preset parameters correspond to different first information; wherein, the preset parameters include at least one of the following: an antenna panel; an antenna; an antenna connector; an antenna port; a carrier; a frequency band; or an external environment parameter; the external environment parameter includes a temperature, an air pressure and/or an altitude.

Wherein, the time-based positioning measurement value includes at least one of the following: downlink reference signal time difference; uplink relative arrival time; terminal sending and receiving time difference; or base station sending and receiving time difference.

Wherein, the information included in the first information is transmitted by means of independent transmission or combined transmission; wherein, the independent transmission refers to that the information included in the first information is transmitted separately; the combined transmission refers to at least two items of information included in the first information are combined into one information for transmission.

In the embodiments of the present disclosure, the sending and receiving timing error value, the receiving timing error value and the sending timing error value all refer to residual timing error values after pre-calibration by the terminal or the base station.

Wherein, the compensating for the time-based positioning measurement value according to the first information includes: subtracting a value corresponding to the first information from an initial positioning measurement value to obtain the compensated positioning measurement.

What needs to be explained here is that the network device provided by the embodiments of the present disclosure can implement all the method steps implemented by the method embodiment in the embodiment 4, and can achieve the same technical effect. The same parts and beneficial effects as those in the method embodiment will not be described in detail.

Figure 14:
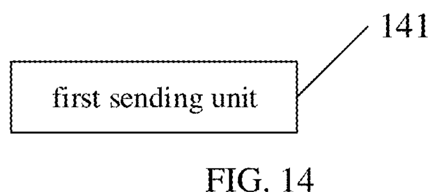
FIG. 14 is a first structural schematic diagram of an information processing device according to an embodiment of the present disclosure.

An embodiment of the present disclosure also provides an information processing device, which is applied to a first network device, as shown in FIG. 14, including:

a first sending unit 141 is configured to send first information associated with sending and receiving timing delay or timing error to a terminal and/or a second network device;

wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station;

the first network device is the base station, the second network device is a positioning server; or, the first network device is the positioning server, and the second network device is the base station;

the first information is internal delay information or delay error information of the terminal or the base station.

The information processing device provided in the embodiments of the present disclosure sends the first information associated with the sending and receiving timing delay or timing error to the terminal and/or the second network device; wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station; the first network device is the base station, the second network device is a positioning server; or, the first network device is the positioning server, and the second network device is the base station; the first information is internal delay information or delay error information of the terminal or the base station, it can realize that the information related to the UE or gNB sending and receiving timing error (or sending and receiving timing delay) is indicated, so as to assist the network device or UE to determine whether time-based positioning measurement value has a time measurement error (or time delay) and the specific value of the time measurement error (or time delay), so that the network device or UE can use the information to compensate or adjust the time-based positioning measurement value when computing the terminal position, so as to avoid the impact of the sending and receiving timing error on the terminal position calculation accuracy, improve the positioning accuracy of the system, and solve the problem in the related art that the sending and receiving timing error cannot be known and affect the positioning accuracy.

Wherein, the first information includes at least one of the following information: the sending and receiving timing delay value of the terminal or the base station; the sending and receiving timing uncertainty information of the terminal or the base station; the sending and receiving timing error value of the terminal or the base station value; the receiving timing delay value of the terminal or the base station; the receiving timing uncertainty information of the terminal or the base station; the receiving timing error value of the terminal or the base station; the sending timing delay value of the terminal or the base station; the sending timing uncertainty information of the terminal or the base station; the sending timing error value of the terminal or the base station; the synchronization error information between the base stations.

In an embodiment of the present disclosure, the antenna unit includes at least one of the following: an antenna, an antenna connector, an antenna port, or an antenna panel.

Wherein, the first information is product information or measurement information.

In the embodiment of the present disclosure, in the case that the first information is the measurement information, and the first network device is the base station, the operation further includes: before the sending first information associated with sending and receiving timing delay or timing error to a terminal and/or a second network device, sending a calibration measurement signal using a sending antenna unit of the first network device; receiving the calibration measurement signal using a receiving antenna unit of the first network device; determining the first information according to a sending time and a receiving time of the calibration measurement signal.

Wherein, in the case that the first information is the measurement information, and the first network device is a positioning server, the operation further includes: before the sending first information associated with sending and receiving timing delay or timing error to a terminal and/or a second network device, receiving the first information sent by the terminal or the base station.

In the embodiment of the present disclosure, the first information corresponds to a preset parameter, and different preset parameters correspond to different first information; wherein, the preset parameters include at least one of the following: an antenna panel; an antenna; an antenna connector; an antenna port; a carrier; a frequency band; or an external environment parameter; the external environment parameter includes a temperature, an air pressure and/or an altitude.

Wherein, the information included in the first information is transmitted by means of independent transmission or combined transmission; wherein, the independent transmission refers to that the information included in the first information is transmitted separately; the combined transmission refers to at least two items of information included in the first information are combined into one information for transmission.

In the embodiments of the present disclosure, the sending and receiving timing error value, the receiving timing error value and the sending timing error value all refer to residual timing error values after pre-calibration by the terminal or the base station.

It should be noted here that the device provided by the embodiment of the present disclosure can realize all the method steps realized by the method embodiment in the embodiment 1, and can achieve the same technical effect. The same parts and beneficial effects of the method embodiments are not described in detail.

Figure 15:
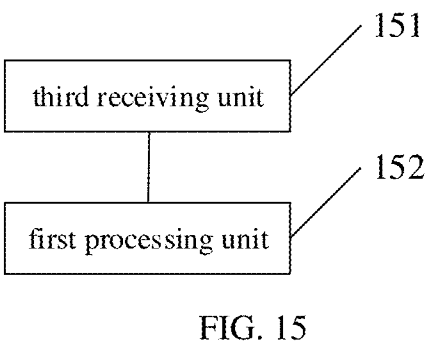
FIG. 15 is a second structural schematic diagram of an information processing device according to an embodiment of the present disclosure.

An embodiment of the present disclosure also provides an information processing device, which is applied to a terminal, as shown in FIG. 15, including:

a third receiving unit 151, configured to receive the first information associated with the sending and receiving timing delay or timing error sent by a first network device;

a first processing unit 152, configured to compensate for a time-based positioning measurement value according to the first information; wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station;

the first network device is the base station, or, the first network device is the positioning server, the first information is internal delay information or delay error information of the terminal or the base station.

The information processing device provided in the embodiments of the present disclosure receives the first information associated with the sending and receiving timing delay or timing error sent by the first network device; compensate for the time-based positioning measurement value according to the first information; wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station; the first network device is the base station, or, the first network device is the positioning server; the first information is internal delay information or delay error information of the terminal or the base station, it can realize that the information related to the UE or gNB sending and receiving timing error (or sending and receiving timing delay) is indicated, so as to assist the network device or UE to determine whether time-based positioning measurement value has a time measurement error (or time delay) and the specific value of the time measurement error (or time delay), so that the network device or UE can use the information to compensate or adjust the time-based positioning measurement value when computing the terminal position, so as to avoid the impact of the sending and receiving timing error on the terminal position calculation accuracy, improve the positioning accuracy of the system, and solve the problem in the related art that the sending and receiving timing error cannot be known and affect the positioning accuracy.

Wherein, the first information includes at least one of the following information: the sending and receiving timing delay value of the terminal or the base station; the sending and receiving timing uncertainty information of the terminal or the base station; the sending and receiving timing error value of the terminal or the base station value; the receiving timing delay value of the terminal or the base station; the receiving timing uncertainty information of the terminal or the base station; the receiving timing error value of the terminal or the base station; the sending timing delay value of the terminal or the base station; the sending timing uncertainty information of the terminal or the base station; the sending timing error value of the terminal or the base station; the synchronization error information between the base stations.

In an embodiment of the present disclosure, the antenna unit includes at least one of the following: an antenna, an antenna connector, an antenna port, or an antenna panel.

Wherein, the first information is product information or measurement information.

In the embodiment of the present disclosure, the first information corresponds to a preset parameter, and different preset parameters correspond to different first information; wherein, the preset parameters include at least one of the following: an antenna panel; an antenna; an antenna connector; an antenna port; a carrier; a frequency band; or an external environment parameter; the external environment parameter includes a temperature, an air pressure and/or an altitude.

Wherein, the time-based positioning measurement value includes at least one of the following: downlink reference signal time difference; uplink relative arrival time; terminal sending and receiving time difference; or base station sending and receiving time difference.

Wherein, the information included in the first information is transmitted by means of independent transmission or combined transmission; wherein, the independent transmission refers to that the information included in the first information is transmitted separately; the combined transmission refers to at least two items of information included in the first information are combined into one information for transmission.

Wherein, the sending and receiving timing error value, the receiving timing error value and the transmitting timing error value all refer to residual timing error values after pre-calibration by the terminal or the base station.

In an embodiment of the present disclosure, the compensating the time-based positioning measurement value according to the first information includes: subtracting an initial positioning measurement value from a value corresponding to the first information to obtain the compensated positioning measurement.

What needs to be explained here is that the device provided by the embodiment of the present disclosure can realize all the method steps realized by the method embodiment in the embodiment 2, and can achieve the same technical effect. The same parts and beneficial effects of the method embodiments are not described in detail.

Figure 16:
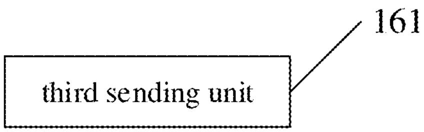
FIG. 16 is a third structural schematic diagram of an information processing device according to an embodiment of the present disclosure.

An embodiment of the present disclosure also provides an information processing device, which is applied to a terminal, as shown in FIG. 16, including:

a third sending unit 161, configured to send first information associated with sending and receiving timing delay or timing error to a second network device;

wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station;

the second network device is a positioning server; or, the second network device is the base station;

the first information is internal delay information or delay error information of the terminal or the base station.

The terminal provided by the embodiments of the present disclosure sends the first information associated with the sending and receiving timing delay or timing error to the second network device; wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station; the second network device is a positioning server; or, the second network device is the base station; the first information is internal delay information or delay error information of the terminal or the base station, it can realize that the information related to the UE or gNB sending and receiving timing error (or sending and receiving timing delay) is indicated, so as to assist the network device or UE to determine whether time-based positioning measurement value has a time measurement error (or time delay) and the specific value of the time measurement error (or time delay), so that the network device or UE can use the information to compensate or adjust the time-based positioning measurement value when computing the terminal position, so as to avoid the impact of the sending and receiving timing error on the terminal position calculation accuracy, improve the positioning accuracy of the system, and solve the problem in the related art that the sending and receiving timing error cannot be known and affect the positioning accuracy.

Wherein, the first information includes at least one of the following information: the sending and receiving timing delay value of the terminal or the base station; the sending and receiving timing uncertainty information of the terminal or the base station; the sending and receiving timing error value of the terminal or the base station value; the receiving timing delay value of the terminal or the base station; the receiving timing uncertainty information of the terminal or the base station; the receiving timing error value of the terminal or the base station; the sending timing delay value of the terminal or the base station; the sending timing uncertainty information of the terminal or the base station; the sending timing error value of the terminal or the base station; the synchronization error information between the base stations.

In an embodiment of the present disclosure, the antenna unit includes at least one of the following: an antenna, an antenna connector, an antenna port, or an antenna panel.

Wherein, the operation further includes: before sending the first information associated with the sending and receiving timing delay or timing error to the second network device, determining whether the terminal measures or sends the first information according to the configuration parameter.

In the embodiment of the present disclosure, the first information is product information or measurement information.

In the embodiment of the present disclosure, the first information is the measurement information, before the sending first information associated with sending and receiving timing delay or timing error to a second network device, the method further includes: sending a calibration measurement signal using a sending antenna unit of the terminal; receiving the calibration measurement signal using a receiving antenna unit of the terminal; determining the first information according to a sending time and a receiving time of the calibration measurement signal.

In the embodiment of the present disclosure, the first information corresponds to a preset parameter, and different preset parameters correspond to different first information; wherein, the preset parameters include at least one of the following: an antenna panel; an antenna; an antenna connector; an antenna port; a carrier; a frequency band; or an external environment parameter; the external environment parameter includes a temperature, an air pressure and/or an altitude.

Wherein, the information included in the first information is transmitted by means of independent transmission or combined transmission; wherein, the independent transmission refers to that the information included in the first information is transmitted separately; the combined transmission refers to at least two items of information included in the first information are combined into one information for transmission.

In the embodiments of the present disclosure, the sending and receiving timing error value, the receiving timing error value and the sending timing error value all refer to residual timing error values after pre-calibration by the terminal or the base station.

It should be noted here that the device provided by the embodiment of the present disclosure can realize all the method steps realized by the method embodiment in the third embodiment, and can achieve the same technical effect. The same parts and beneficial effects of the method embodiments are not described in detail.

Figure 17:
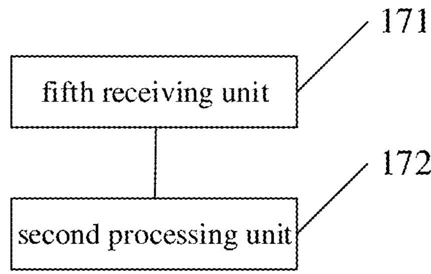
FIG. 17 is a fourth structural schematic diagram of an information processing device according to an embodiment of the present disclosure.

An embodiment of the present disclosure also provides an information processing device, which is applied to a second network device, as shown in FIG. 17, including:

a fifth receiving unit 171, configured to receive first information associated with sending and receiving timing delay or timing error sent by a first network device or a terminal;

a second processing unit 172, configured to compensate for a time-based positioning measurement value according to the first information;

wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station;

the first network device is the base station, the second network device is a positioning server; or, the first network device is the positioning server, and the second network device is the base station;

the first information is internal delay information or delay error information of the terminal or the base station.

The information processing device provided in the embodiments of the present disclosure receives the first information associated with the sending and receiving timing delay or timing error sent by the first network device or the terminal; compensate for the time-based positioning measurement value according to the first information; wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station; the first network device is the base station, the second network device is a positioning server; or, the first network device is the positioning server, and the second network device is the base station; the first information is internal delay information or delay error information of the terminal or the base station, it can realize that the information related to the UE or gNB sending and receiving timing error (or sending and receiving timing delay) is indicated, so as to assist the network device or UE to determine whether time-based positioning measurement value has a time measurement error (or time delay) and the specific value of the time measurement error (or time delay), so that the network device or UE can use the information to compensate or adjust the time-based positioning measurement value when computing the terminal position, so as to avoid the impact of the sending and receiving timing error on the terminal position calculation accuracy, improve the positioning accuracy of the system, and solve the problem in the related art that the sending and receiving timing error cannot be known and affect the positioning accuracy.

Wherein, the first information includes at least one of the following information: the sending and receiving timing delay value of the terminal or the base station; the sending and receiving timing uncertainty information of the terminal or the base station; the sending and receiving timing error value of the terminal or the base station value; the receiving timing delay value of the terminal or the base station; the receiving timing uncertainty information of the terminal or the base station; the receiving timing error value of the terminal or the base station; the sending timing delay value of the terminal or the base station; the sending timing uncertainty information of the terminal or the base station; the sending timing error value of the terminal or the base station; the synchronization error information between the base stations.

In the embodiment of the present disclosure, the first information is product information or measurement information.

In the embodiment of the present disclosure, the first information corresponds to a preset parameter, and different preset parameters correspond to different first information; wherein, the preset parameters include at least one of the following: an antenna panel; an antenna; an antenna connector; an antenna port; a carrier; a frequency band; or an external environment parameter; the external environment parameter includes a temperature, an air pressure and/or an altitude.

Wherein, the time-based positioning measurement value includes at least one of the following: downlink reference signal time difference; uplink relative arrival time; terminal sending and receiving time difference; or base station sending and receiving time difference.

Wherein, the information included in the first information is transmitted by means of independent transmission or combined transmission; wherein, the independent transmission refers to that the information included in the first information is transmitted separately; the combined transmission refers to at least two items of information included in the first information are combined into one information for transmission.

In the embodiments of the present disclosure, the sending and receiving timing error value, the receiving timing error value and the sending timing error value all refer to residual timing error values after pre-calibration by the terminal or the base station.

Wherein, the compensating for the time-based positioning measurement value according to the first information includes: subtracting a value corresponding to the first information from an initial positioning measurement value to obtain the compensated positioning measurement.

It should be noted here that the device provided by the embodiment of the present disclosure can realize all the method steps implemented by the method embodiment in the embodiment 4, and can achieve the same technical effect. The same parts and beneficial effects of the method embodiments are not described in detail.

It should be noted that the division of the units in the embodiment of the present disclosure is schematic, and is only a logical function division, and there may be another division manner in actual implementation. In addition, each functional unit in each embodiment of the present disclosure may be integrated into one processing unit, each unit may exist separately physically, or two or more units may be integrated into one unit. The integrated units can be implemented in the form of hardware or in the form of software functional units.

If the integrated unit is implemented in the form of a software function unit and sold or used as an independent product, it can be stored in a processor-readable storage medium. Based on this understanding, the essence of the technical solution of the present disclosure or the part that contributes to the related art or all or part of the technical solution can be embodied in the form of a software product, and the computer software product is stored in a storage medium. Several instructions are included to make a computer device (which may be a personal computer, a server, or a network device, etc.) or a processor execute all or part of the steps of the methods described in the various embodiments of the present disclosure. The storage medium include: U disk, mobile hard disk, read-only memory (ROM), random access memory (RAM), magnetic disk or optical disk and other media that can store program codes.

The embodiment of the present disclosure also provides a processor-readable storage medium, the processor-readable storage medium stores a computer program, and the computer program is used to enable the processor to execute the sequence transmission method provided by the embodiment of the present disclosure, Alternatively, the computer program is used to enable the processor to execute the sequence receiving method provided by the embodiments of the present disclosure.

The processor-readable storage medium can be any available medium or data storage device that can be accessed by a processor, including but not limited to magnetic storage (such as floppy disk, hard disk, magnetic tape, magneto-optical disk (MO), etc.), optical storage (such as CD, DVD, BD, HVD, etc.), and semiconductor memory (such as ROM, EPROM, EEPROM, non-volatile memory (NAND FLASH), solid-state drive (SSD)), etc.

Those skilled in the art should understand that the embodiments of the present disclosure may be provided as methods, systems, or computer program products. Accordingly, the present disclosure may take the form of an entirely hardware embodiment, an entirely software embodiment, or an embodiment combining software and hardware. Furthermore, the present disclosure may take the form of a computer program product embodied on one or more computer-usable storage media (including but not limited to disk storage and optical storage, etc.) having computer-usable program code embodied therein.

The present disclosure is described with reference to flowchart illustrations and/or block diagrams of methods, apparatus (systems), and computer program products according to embodiments of the disclosure. It should be understood that each procedure and/or block in the flowchart and/or block diagrams, and combinations of procedures and/or blocks in the flowchart and/or block diagrams can be implemented by computer-executable instructions. These computer-executable instructions can be provided to a general purpose computer, special purpose computer, embedded processor, or processor of other programmable data processing equipment to produce a machine, such that instructions executed by the processor of the computer or other programmable data processing equipment produce device for realizing the functions specified in one or more procedures of a flowchart and/or one or more blocks of a block diagram.

These processor-executable instructions can also be loaded onto a computer or other programmable data processing device, causing a series of operational steps to be performed on the computer or other programmable device to produce a computer-implemented processing, the instructions executed on the computer and other programmable device provide steps for implementing the functions specified in one or more flows of the flowchart or one or more block in the block diagram.

It should be noted that it should be understood that the division of the above modules is only a division of logical functions, and may be fully or partially integrated into a physical entity or physically separated during actual implementation. And these modules can all be implemented in the form of calling software through processing elements; they can also be implemented in the form of hardware; some modules can also be implemented in the form of calling software through processing elements, and some modules can be implemented in the form of hardware. For example, the determining module may be a separate processing element, or may be integrated in a chip of the device. In addition, it may be stored in the memory of the device in the form of program code, and a certain processing element of the device may call and execute the functions of the modules identified above. The implementation of other modules is similar. In addition, all or part of these modules can be integrated together, and can also be implemented independently. The processing element mentioned here may be an integrated circuit with signal processing capability. In the implementation process, each step of the above method or each module above can be completed by an integrated logic circuit of hardware in the processor element or an instruction in the form of software.

For example, each module, unit, subunit or submodule may be one or more integrated circuits configured to implement the above method, for example: one or more specific integrated circuits (Application Specific Integrated Circuit, ASIC), or, one or Multiple microprocessors (digital signal processor, DSP), or, one or more field programmable gate arrays (FPGA), etc. For another example, when one of the above modules is implemented in the form of a processing element scheduling program code, the processing element may be a general-purpose processor, such as a central processing unit (CPU) or other processors that can call program codes. For another example, these modules can be integrated together and implemented in the form of a system-on-a-chip (SOC).

The terms “first”, “second” and the like in the specification and claims of the present disclosure are used to distinguish similar objects, and are not necessarily used to describe a specific order or sequence. It should be understood that the data so used may be interchanged under appropriate circumstances such that the embodiments of the disclosure described herein are practiced, for example, in sequences other than those illustrated or described herein. Furthermore, the terms "comprising" and "having", as well as any variations thereof, are intended to cover a non-exclusive inclusion, for example, a process, method, system, product or device comprising a sequence of steps or elements is not necessarily limited to the expressly listed instead, may include other steps or elements not explicitly listed or inherent to the process, method, product or apparatus. In addition, the use of "and/or" in the description and claims means at least one of the connected objects, such as A and/or B and/or C, means that it includes A alone, B alone, C alone, and both A and B, both B and C, both A and C, and A, B, and C all exist, there are 7 situations. Similarly, the use of "at least one of A or B" in the present disclosure and claims should be understood as "A alone, B alone, or both A and B".

Obviously, those skilled in the art can make various changes and modifications to the present disclosure without departing from the spirit and scope of the present disclosure. In this way, if these change and modifications fall within the scope of the claims of the present disclosure and their equivalence, the present disclosure is also intended to include these change and modifications.

What is claimed is:

1. An information processing method, applied to a first network device, comprising:

sending first information associated with sending and receiving timing delay or timing error to a terminal and/or a second network device;

wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station;

the first network device is the base station, the second network device is a positioning server; or, the first network device is the positioning server, and the second network device is the base station;

the first information is internal delay information or delay error information of the terminal or the base station;

wherein the first information includes a sending timing error value of the terminal or the base station;

wherein the first information is used for compensating for a time-based positioning measurement value by subtracting a value corresponding to the first information from an initial positioning measurement value to obtain a compensated positioning measurement value.

2. A network device, being a first network device, including a memory, a transceiver, and a processor, wherein the memory is used to store computer programs; the transceiver is used to send and receive data under the control of the processor; the processor is used to read the computer programs in the memory and perform the information processing method according to claim 1.

3. An information processing method, applied to a terminal, comprising:

receiving first information associated with sending and receiving timing delay or timing error sent by a first network device;

compensating for a time-based positioning measurement value according to the first information; wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station;

the first network device is the base station, or, the first network device is the positioning server, the first information is internal delay information or delay error information of the terminal or the base station;

wherein the first information includes a sending timing error value of the terminal or the base station;

wherein the compensating for the time-based positioning measurement value according to the first information includes:

subtracting a value corresponding to the first information from an initial positioning measurement value to obtain a compensated positioning measurement value.

4. The information processing method according to claim 3, wherein the first information further includes at least one of the following information:

a sending and receiving timing delay value of the terminal or the base station;

sending and receiving timing uncertainty information of the terminal or the base station;

a sending and receiving timing error value of the terminal or the base station value;

a receiving timing delay value of the terminal or the base station;

receiving timing uncertainty information of the terminal or the base station;

a receiving timing error value of the terminal or the base station;

a sending timing delay value of the terminal or the base station;

sending timing uncertainty information of the terminal or the base station;

or synchronization error information between the base stations.

5. The information processing method according to claim 4, wherein the sending and receiving timing error value, the receiving timing error value and the sending timing error value all refer to residual timing error values after pre-calibration by the terminal or the base station.

6. The information processing method according to claim 3, wherein the antenna unit comprises at least one of the following:

an antenna, an antenna connector, an antenna port, or an antenna panel.

7. The information processing method according to claim 3, wherein the first information is product information or measurement information.

8. The information processing method according to claim 3, wherein the first information corresponds to a preset parameter, and different preset parameters correspond to different first information;

the preset parameter includes at least one of the following:

an antenna panel;

an antenna;

an antenna connector;

an antenna port;

a carrier;

a frequency band; or an external environment parameter;

wherein the external environment parameter includes a temperature, an air pressure and/or an altitude.

9. The information processing method according to claim 3, wherein the time-based positioning measurement value includes at least one of the following:

downlink reference signal time difference;

uplink relative arrival time;

terminal sending and receiving time difference; or base station sending and receiving time difference.

10. The information processing method according to claim 3, wherein information included in the first information is transmitted by means of independent transmission or combined transmission;

the independent transmission refers to that the information included in the first information is transmitted separately;

the combined transmission refers to at least two items of the information included in the first information are combined into one information for transmission.

11. A terminal, including a memory, a transceiver, and a processor, wherein a memory is used to store computer programs; the transceiver is used to send and receive data under the control of the processor; the processor is used to read the computer programs in the memory and perform the information processing method according to claim 3.

12. An information processing method, applied to a terminal, comprising:

sending first information associated with sending and receiving timing delay or timing error to a second network device;

wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station;

the second network device is a positioning server; or, the second network device is the base station;

the first information is internal delay information or delay error information of the terminal or the base station;

wherein the first information includes a sending timing error value of the terminal or the base station;

wherein the first information is used for compensating for a time-based positioning measurement value by subtracting a value corresponding to the first information from an initial positioning measurement value to obtain a compensated positioning measurement value.

13. The information processing method according to claim 12, wherein the first information further includes at least one of the following information:

a sending and receiving timing delay value of the terminal or the base station;

sending and receiving timing uncertainty information of the terminal or the base station;

a sending and receiving timing error value of the terminal or the base station value;

a receiving timing delay value of the terminal or the base station;

receiving timing uncertainty information of the terminal or the base station;

a receiving timing error value of the terminal or the base station;

a sending timing delay value of the terminal or the base station;

sending timing uncertainty information of the terminal or the base station;

or synchronization error information between the base stations.

14. The information processing method according to claim 12, wherein the antenna unit comprises at least one of the following:

an antenna, an antenna connector, an antenna port, or an antenna panel.

15. The information processing method according to claim 12, wherein, before the sending first information associated with sending and receiving timing delay or timing error to a second network device, the method further includes:

determining whether the terminal measures or sends the first information according to a configuration parameter.

16. The information processing method according to claim 12, wherein the first information is product information or measurement information.

17. A terminal, including a memory, a transceiver, and a processor, wherein the memory is used to store computer programs; the transceiver is used to send and receive data under the control of the processor; the processor is used to read the computer programs in the memory and perform the information processing method according to claim 12.

18. An information processing method, applied to a second network device, comprising:

receiving first information associated with sending and receiving timing delay or timing error sent by a first network device or a terminal;

compensating for a time-based positioning measurement value according to the first information;

wherein, the sending and receiving timing delay or timing error refers to signal transmission delay or delay error between an antenna unit of the terminal and a baseband unit of the terminal, or signal transmission delay or delay error between an antenna unit of a base station and a baseband unit of the base station;

the first network device is the base station, the second network device is a positioning server;

or, the first network device is the positioning server, and the second network device is the base station;

the first information is internal delay information or delay error information of the terminal or the base station;

wherein the first information includes a sending timing error value of the terminal or the base station;

wherein the compensating for the time-based positioning measurement value according to the first information includes:

subtracting a value corresponding to the first information from an initial positioning measurement value to obtain a compensated positioning measurement value.

19. A network device, being a second network device, including a memory, a transceiver, and a processor, wherein the memory is used to store computer programs; the transceiver is used to send and receive data under the control of the processor; the processor is used to read the computer programs in the memory and perform the information processing method according to claim 18.

* * * * *